(12) United States Patent
Hoshi et al.

(10) Patent No.: US 9,685,682 B2
(45) Date of Patent: Jun. 20, 2017

(54) SECONDARY BATTERY MODULE

(75) Inventors: Hiroshi Hoshi, Hitachinaka (JP); Tsunemi Aiba, Hitachinaka (JP); Naoki Kojima, Hitachinaka (JP); Chikara Kikkawa, Hitachinaka (JP); Toshiyuki Yoshida, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 596 days.

(21) Appl. No.: 14/111,074

(22) PCT Filed: Aug. 31, 2011

(86) PCT No.: PCT/JP2011/069737
§ 371 (c)(1),
(2), (4) Date: Oct. 10, 2013

(87) PCT Pub. No.: WO2012/140791
PCT Pub. Date: Oct. 18, 2012

(65) Prior Publication Data
US 2014/0030563 A1    Jan. 30, 2014

(30) Foreign Application Priority Data

Apr. 12, 2011 (WO) .................. PCT/JP2011/059049

(51) Int. Cl.
*H01M 10/42* (2006.01)
*H01M 2/10* (2006.01)
(Continued)

(52) U.S. Cl.
CPC ......... *H01M 10/4207* (2013.01); *B60L 1/003* (2013.01); *B60L 1/02* (2013.01);
(Continued)

(58) Field of Classification Search
CPC .......... H01M 2/1077; H01M 10/4207; H01M 10/625; H01M 10/6561; H01M 10/613; H01M 10/5004; H01M 2200/00
See application file for complete search history.

(56) References Cited

U.S. PATENT DOCUMENTS

D485,530 S  *  1/2004  Ogasawara .................. D13/103
2003/0077485 A1*  4/2003  Streuer ............... H01M 2/1072
429/7

(Continued)

FOREIGN PATENT DOCUMENTS

GB          2460946   * 12/2009  ............. H01M 1/50
JP       2001-006643 A     1/2001
(Continued)

*Primary Examiner* — Muhammad Siddiquee
(74) *Attorney, Agent, or Firm* — Volpe and Koenig, P.C.

(57) ABSTRACT

A secondary battery module 1 of the present invention stores cell blocks 40 in a module case 2, and cools battery cells 101 in the cell blocks 40 by circulating coolant to the inside of the cell blocks by introduction of the coolant into the module case 2. The secondary battery module has a structure of communicating coolant circulation ports 22 that open to a case wall section 21 of the module case 2 and coolant circulation ports 62a that open to the cell blocks 40 with each other by a communication member 71, and passing wiring through a space region 80 formed outside the communication member 71 and between the case wall section 21 and the cell blocks 40. Thus, wiring can be executed without interfering flow of the coolant, and the total secondary battery module 1 can be miniaturized.

19 Claims, 27 Drawing Sheets

(51) Int. Cl.
| | |
|---|---|
| *H01M 10/625* | (2014.01) |
| *H01M 10/6561* | (2014.01) |
| *H01M 10/613* | (2014.01) |
| *B60L 1/00* | (2006.01) |
| *B60L 1/02* | (2006.01) |
| *B60L 3/00* | (2006.01) |
| *B60L 11/14* | (2006.01) |
| *B60L 11/18* | (2006.01) |

(52) U.S. Cl.
CPC ............ *B60L 3/0046* (2013.01); *B60L 11/14* (2013.01); *B60L 11/1803* (2013.01); *B60L 11/1864* (2013.01); *B60L 11/1874* (2013.01); *B60L 11/1879* (2013.01); *H01M 2/1077* (2013.01); *H01M 10/613* (2015.04); *H01M 10/625* (2015.04); *H01M 10/6561* (2015.04); *B60L 2210/40* (2013.01); *B60L 2240/34* (2013.01); *B60L 2240/545* (2013.01); *B60L 2240/547* (2013.01); *B60L 2240/549* (2013.01); *B60L 2270/12* (2013.01); *H01M 2200/00* (2013.01); *Y02T 10/70* (2013.01); *Y02T 10/7011* (2013.01); *Y02T 10/7061* (2013.01); *Y02T 10/7077* (2013.01); *Y02T 10/7241* (2013.01); *Y02T 90/16* (2013.01)

(56) References Cited

U.S. PATENT DOCUMENTS

2008/0196957 A1\* 8/2008 Koike ..................... B60K 1/04
  180/68.5
2010/0047682 A1\* 2/2010 Houchin-Miller .. H01M 2/1077
  429/120

FOREIGN PATENT DOCUMENTS

| JP | 2006-040625 A | 2/2006 |
| JP | 2009-252460 A | 10/2009 |
| JP | 2010-097824 A | 4/2010 |

\* cited by examiner

FIG.16
(a)
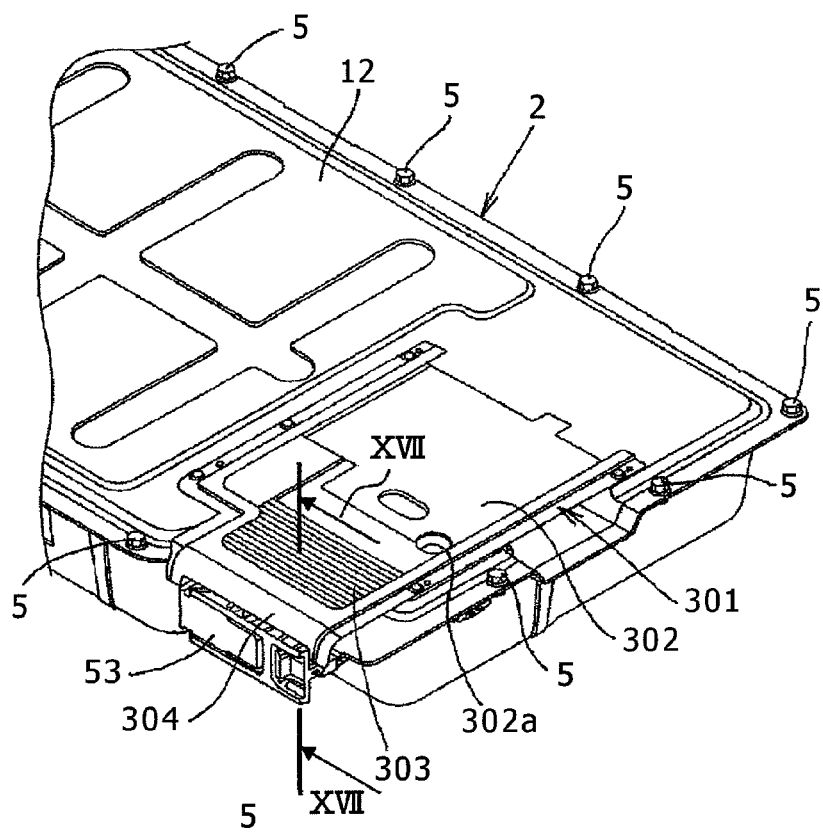
(b)
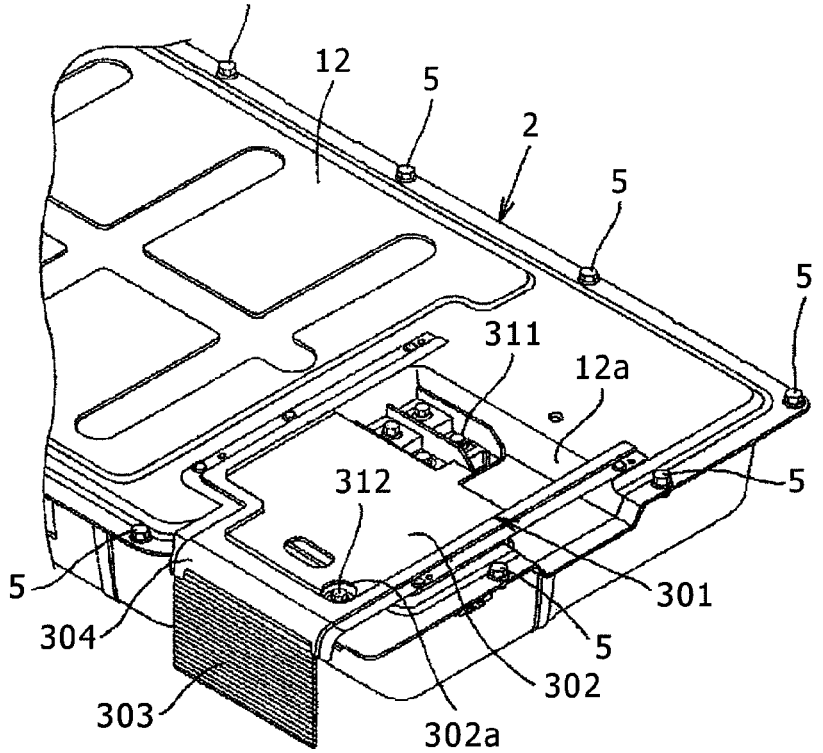

FIG. 21
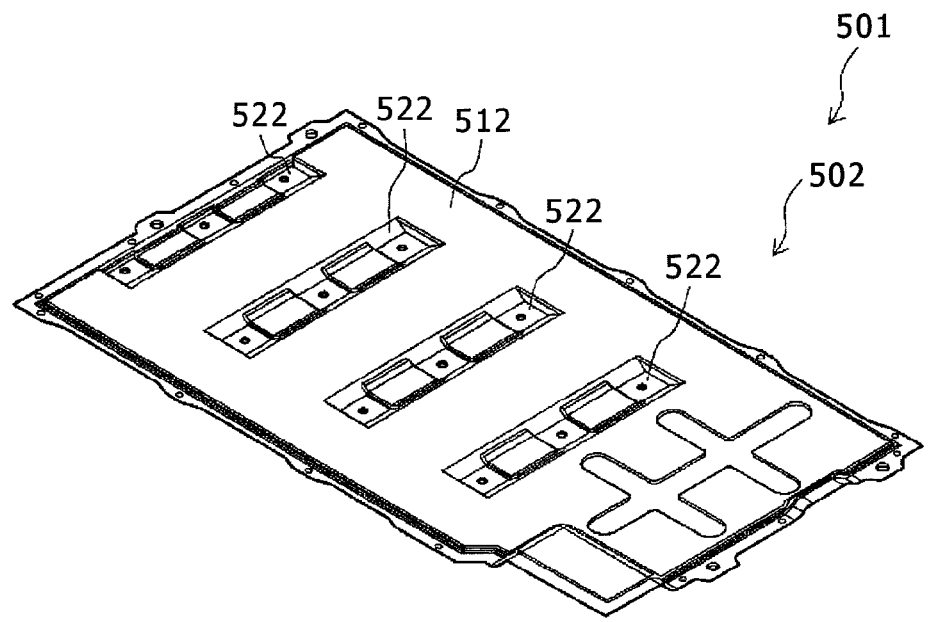
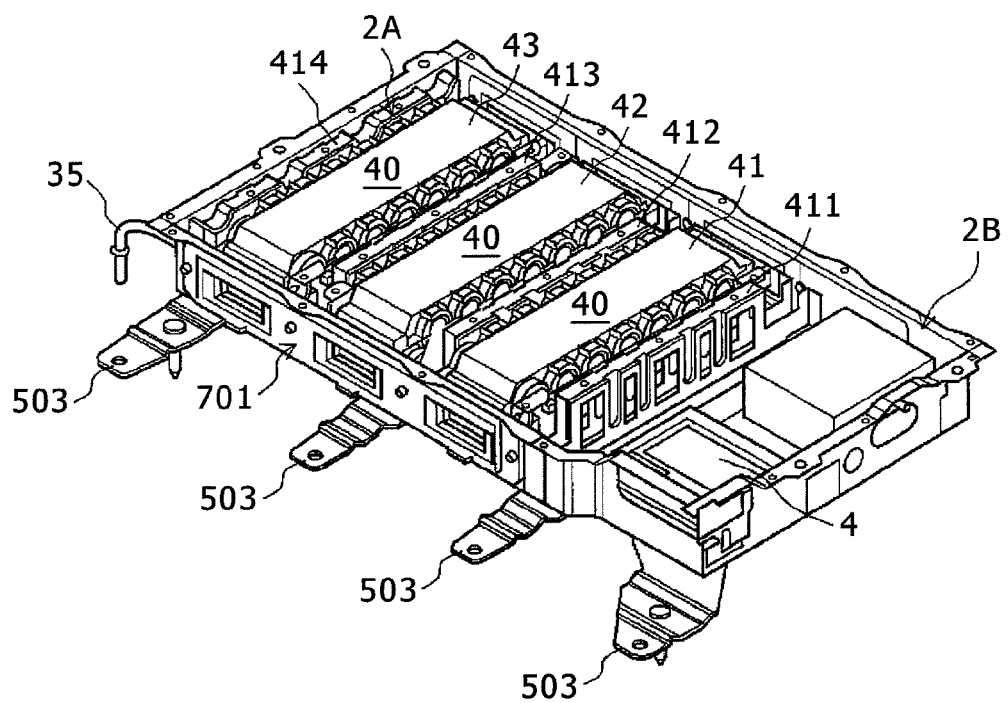

SECONDARY BATTERY MODULE

TECHNICAL FIELD

The present invention relates to a secondary battery module that includes plural battery cells.

BACKGROUND ART

In Patent Literature 1, a power supply unit is disclosed which has a configuration that two holder cases incorporating plural power supply modules are stored in an outer case in a state connected to each other by a power supply line, and the power supply modules are cooled by introducing cooling air to the inside of the outer case.

In a case of the power supply unit having the configuration, in order to prevent the cooling efficiency of the power supply module from dropping because the flow of the cooling air is interfered by the power supply line, the power supply line is arranged along and in parallel with the upper surface of the holder case.

CITATION LIST

Patent Literature

Patent Literature 1: Japanese Unexamined Patent Application Publication No. 2001-6643

SUMMARY OF INVENTION

Technical Problems

However, when harnesses are arranged along the upper surface of the respective holder cases, from the viewpoint of an insulation space, it is necessary to increase the dimension in the height direction. Therefore, the height dimension of the holder case increases by that amount, and the total power supply unit cannot be miniaturized. Also, these harnesses are required to be fixed at plural positions, and fixing work is complicated.

The present invention has been developed in view of the points described above, and its object is to provide a secondary battery module capable of executing wiring without interfering flow of coolant and capable of being miniaturized.

Solution to Problems

The invention of a secondary battery module that achieves the object has a structure in which coolant circulation ports that open to a case wall section of a module case and coolant circulation ports that open to cell blocks communicate with each other by a communication member, and wiring is passed in a space region formed outside the communication member and between the case wall section and the cell blocks.

Advantageous Effects of Invention

According to the present invention, harnesses and wiring of sensor lines and the like can be gathered together in a space region formed outside a communication member and between a case wall section and cell blocks. Also, problems, configurations and effects other than those described above will be clarified by description of embodiments described below.

BRIEF DESCRIPTION OF DRAWINGS

FIG. 16 is a perspective view explaining a structure of a shutter.

FIG. 21 is a perspective view showing a state an upper cap section of the lithium ion battery device is opened.

DESCRIPTION OF EMBODIMENTS

First Embodiment

Below, the first embodiment of the present invention will be described in detail referring to drawings.

In the present embodiment, as an example of a secondary battery module, a case of a lithium ion battery device will be described.

The lithium ion battery device in relation with the present embodiment is applied to an on-vehicle power supply unit in a motor drive system for an electro-motive vehicle, for example an electric motorcar. In the concept of the electric motorcar, a hybrid electric motorcar including an engine that is an internal combustion engine and a motor as drive sources of a vehicle, a genuine electric motorcar having a motor as an only drive source of a vehicle, and the like are included.

Figure 1:
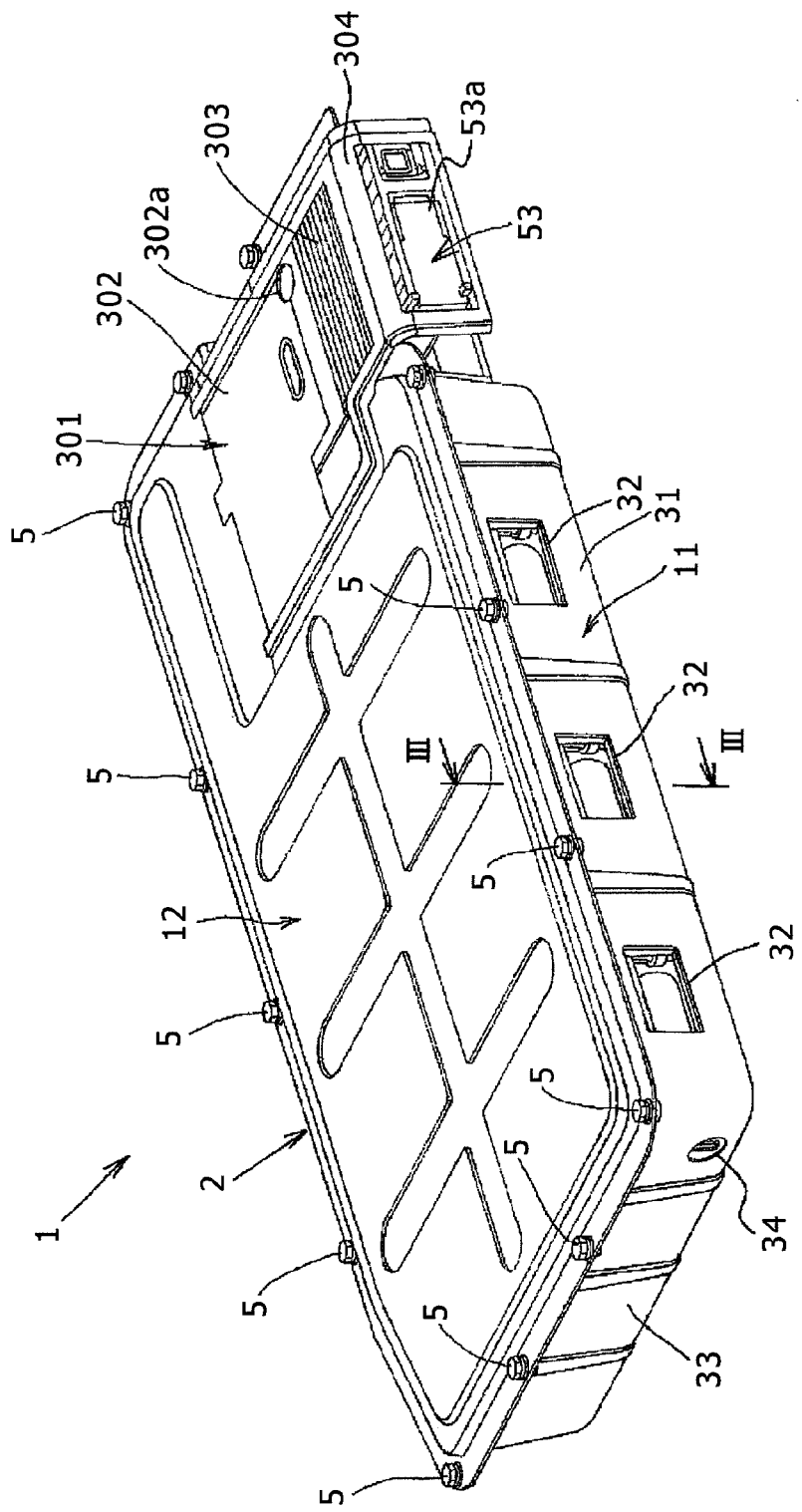
FIG. 1 is a perspective view showing an external appearance configuration of a lithium ion battery device in relation with the first embodiment.
Figure 2:
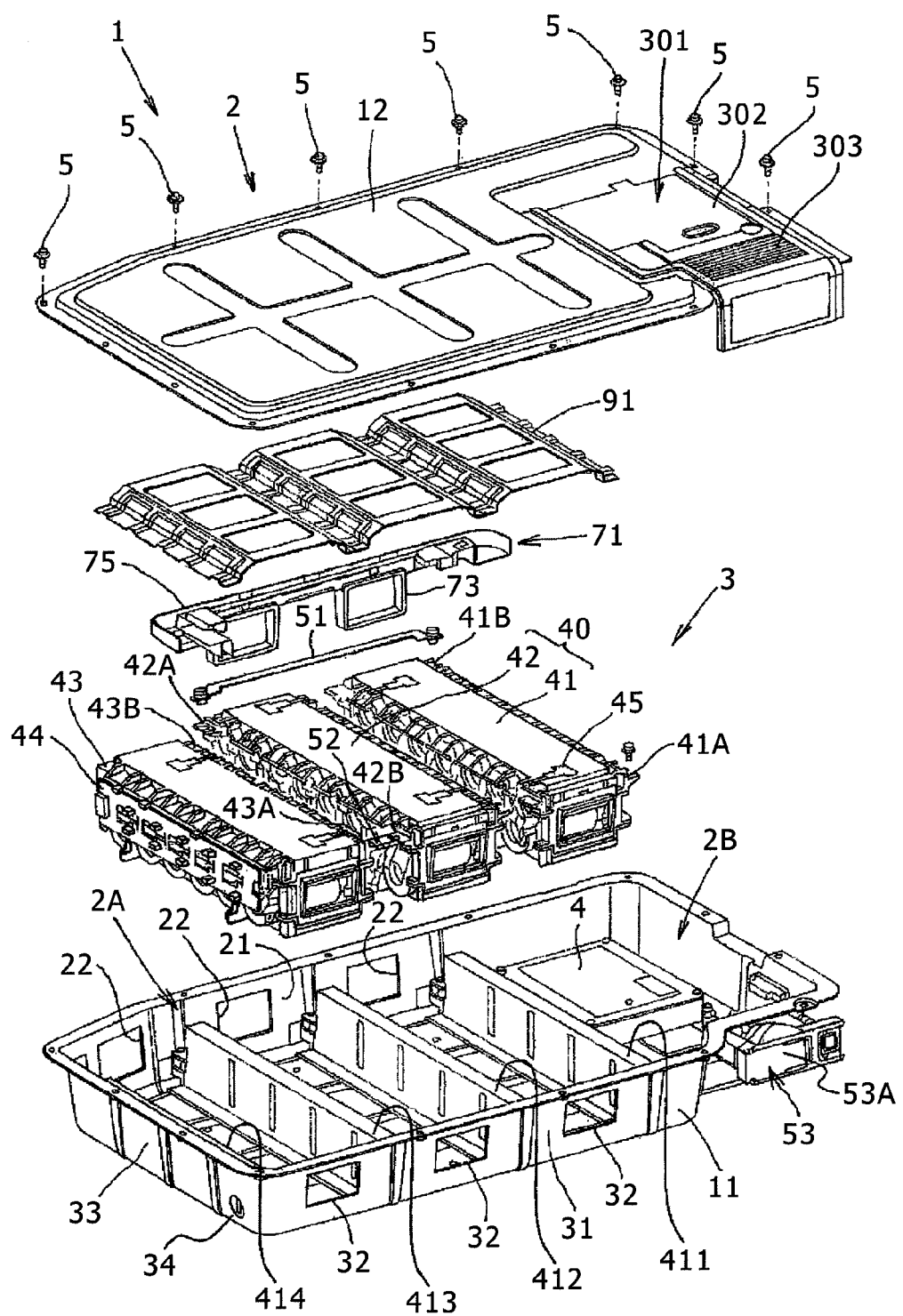
FIG. 2 is an exploded perspective view of FIG. 1.
Figure 3:
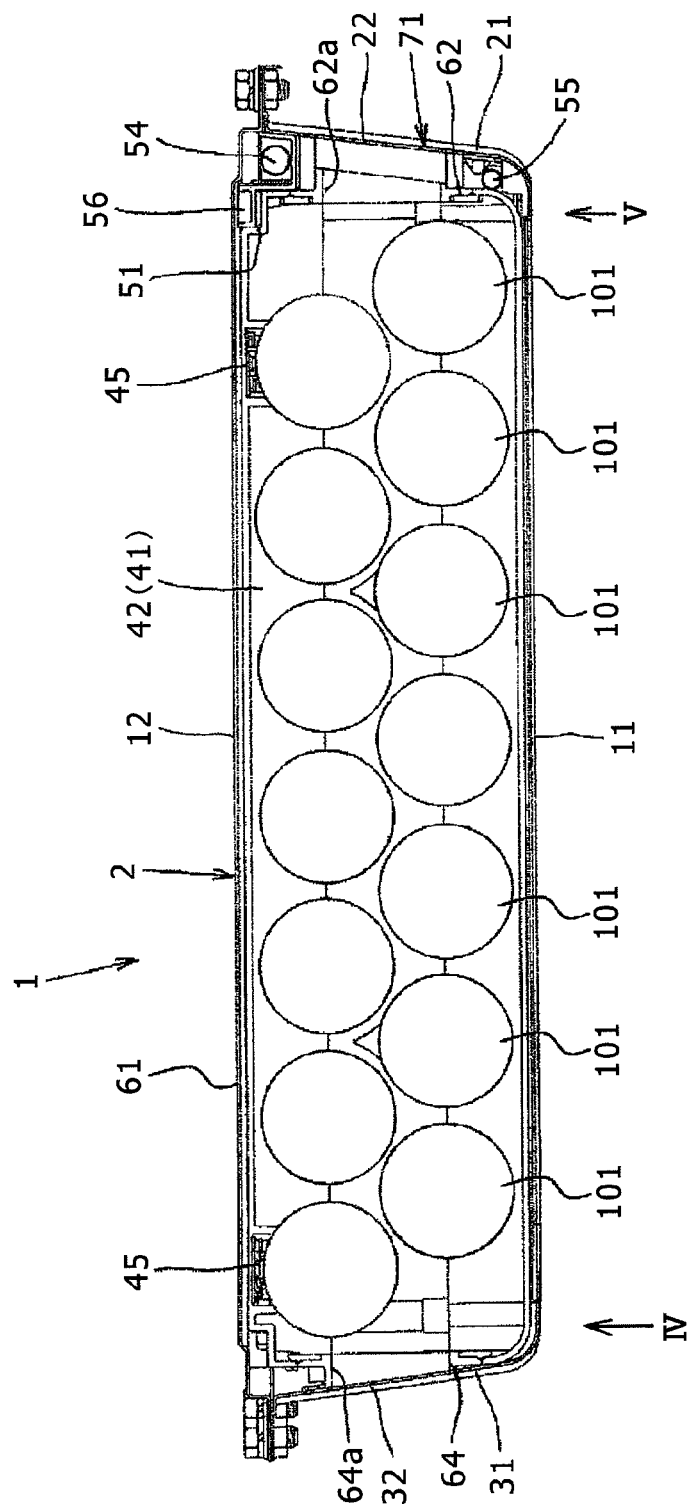
FIG. 3 is a cross-sectional view taken from line III to III of FIG. 1.
Figure 4:
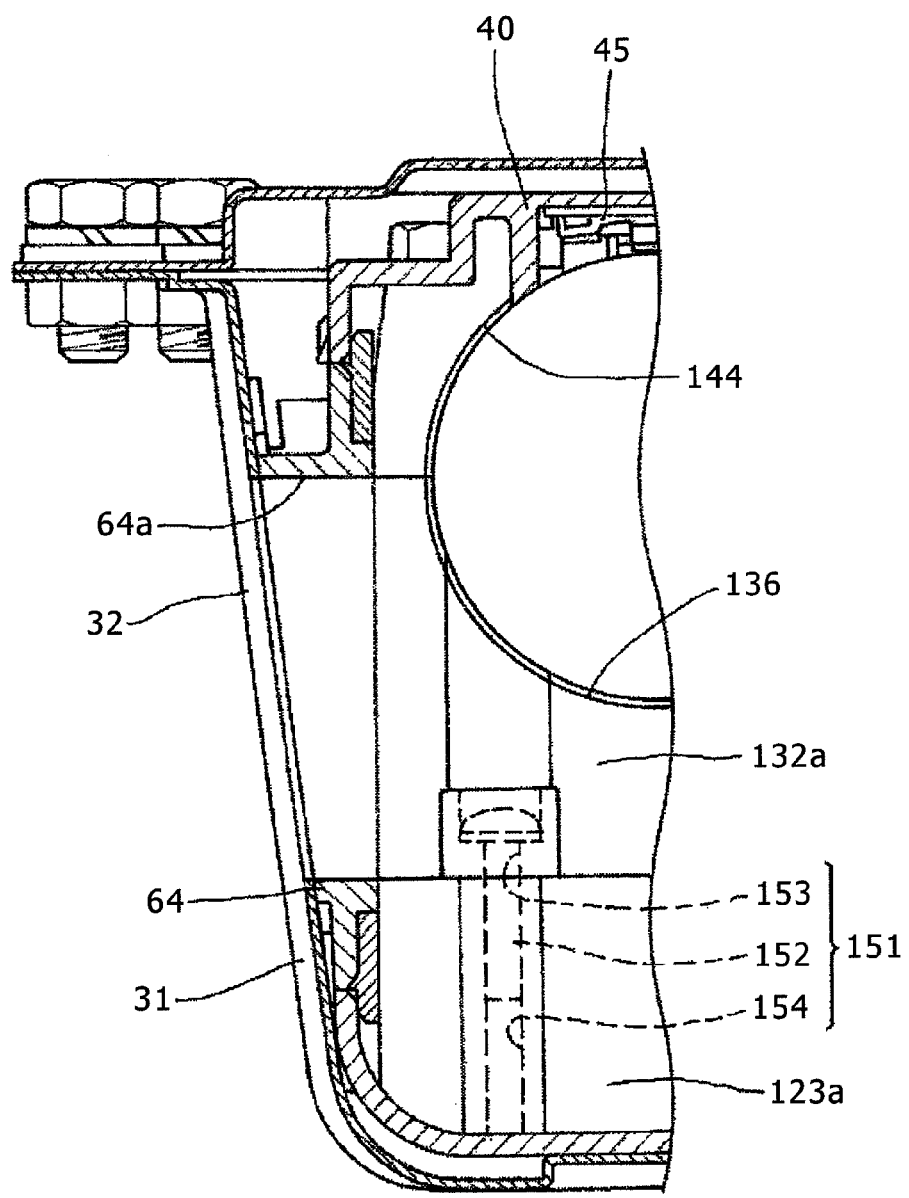
FIG. 4 is an enlarged view of the part IV of FIG. 3.
Figure 5:
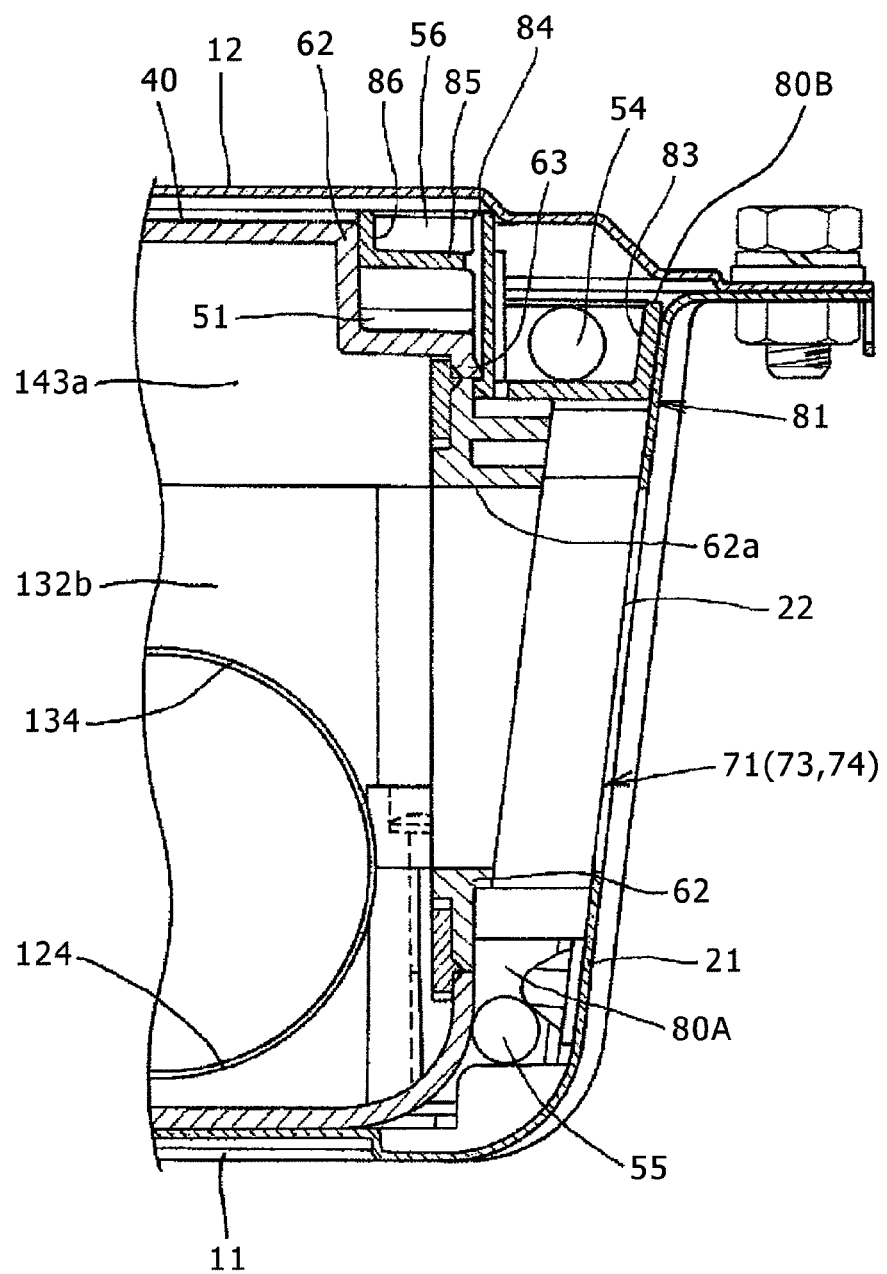
FIG. 5 is an enlarged view of the part V of FIG. 3.

First, the total configuration of a lithium ion battery device will be described using FIG. 1 to FIG. 5. FIG. 1 is a perspective view showing an external appearance configuration of a lithium ion battery device, FIG. 2 is an exploded perspective view of FIG. 1, FIG. 3 is a cross-sectional view taken from line III to III of FIG. 1, FIG. 4 is an enlarged view of the part IV of FIG. 3, and FIG. 5 is an enlarged view of the part V of FIG. 3. Also, in the description below, regardless of the attaching position and the direction of the lithium ion battery device, description will be made with the upstream side of cooling air being the front side, and with the downstream side of cooling air being the back side.

A lithium ion battery device 1 has a configuration that both of a battery unit 3 and a control unit 4 are stored in a module case 2. As shown in FIG. 1 and FIG. 2, the module case 2 has a box shape of a laterally-long rectangular shape spreading in a flat plane shape, and is composed of a lower cap section 11 and an upper cap section 12. The lower cap section 11 has a shallow dish shape having a predetermined depth, and the upper cap section 12 has a flat sheet shape closing the upper part of the lower cap section 11. The upper cap section 12 and the lower cap section 11 are formed by pressing work and the like of a thin sheet made of metal. The lower cap section 11 has a case front wall section 21 and a case back wall section 31 opposing each other so as to depart from each other in the front/back direction of the module case 2. In the case front wall section 21 and the case back wall section 31, suction ports 22 and exhaust ports 32 for circulating cooling air that is coolant through the inside of cell blocks 40 are arranged.

In the module case 2, a battery unit storage area 2A that stores the battery unit 3 is formed on one side in the lateral direction of the module case 2, and a control unit storage area 2B that for stores the control unit 4 is formed on the other side in the lateral direction.

The battery unit 3 includes the three cell blocks 40 of a first cell block 41, a second cell block 42 and a third cell block 43. The respective cell blocks 41 to 43 have a block shape with a long axis, and are disposed in parallel so as to adjoin each other so that the longitudinal directions thereof become parallel to each other. In the present embodiment, the cell blocks 41 to 43 are stored so as to extend in the front/back direction of the module case 2 in the lower cap section 11, and are disposed so as to be arrayed in the order of the first cell block 41, the second cell block 42 and the third cell block 43 toward the direction departing from the control unit storage area 2B.

In the respective cell blocks 41 to 43, positive electrode terminals 41A to 43A and negative electrode terminals 41B to 43B are arranged in portions separate to both sides in the longitudinal direction. In the present embodiment, the first cell block 41 and the second cell block 42 are disposed in parallel so that an end on the positive electrode terminal 41A side of the first cell block 41 and an end on the negative electrode terminal 42B side of the second cell block 42 oppose each other and that an end on the negative electrode terminal 41B side of the first cell block 41 and an end on the positive electrode terminal 42A side of the second cell block 42 oppose each other.

Also, the second cell block 42 and the third cell block 43 are disposed in parallel so that an end on the negative electrode terminal 42B side of the second cell block 42 and an end on the positive electrode terminal 43A side of the third cell block 43 oppose each other and that an end on the positive electrode terminal 42A side of the second cell block 42 and an end on the negative electrode terminal 43B side of the third cell block 43 oppose each other.

Further, the middle of the negative electrode terminal 41B of the first cell block 41 and the positive electrode terminal 42A of the second cell block 42 and the middle of the negative electrode terminal 42B of the second cell block 42 and the positive electrode terminal 43A of the third cell block 43 are electrically connected to each other by bus bars 51, 52. Between the second cell block 42 and the third cell block 43, it is configured that the both can be electrically connected or disconnected by an SD (service disconnect) switch 53. The SD switch 53 is a safety device arranged in order to secure the safety at the time of maintenance and inspection of the lithium ion battery device 1, is composed of an electric circuit in which a switch and a fuse are electrically connected to each other in series, and is operated at the time of maintenance and inspection by a service person.

The positive electrode terminal 41A of the first cell block 41 and the negative electrode terminal 43B of the third cell block 43 are connected to an inverter connection terminal 311 (refer to FIG. 16 (b)) that is an external terminal of the control unit 4 through a harness 54 (refer to FIG. 3 and FIG. 5). The cell block 40 includes a voltage detection substrate 44 and temperature detection sensors 45 which are connected to a control device (not illustrated) of the control unit 4 by a voltage detection line 55 and a sensor line 56 (refer to FIG. 3 and FIG. 5) respectively.

As shown in FIG. 3, the cell block 40 has a configuration that plural battery cells 101 are held in a holding case 61, and coolant circulation ports for circulating coolant in the cell block 40 are arranged in both ends thereof. As the coolant circulation ports, for example, a coolant introduction port 62a for introducing cooling air into the holding case 61 is arranged at a case front end surface section 62 on one side in the longitudinal direction of the holding case 61, and a coolant lead out port 64a for leading out cooling air that has passed in the holding case 61 to outside the holding case 61 is arranged at a case back end surface section 64 on the other side in the longitudinal direction of the holding case 61. Also, in the inside of the holding case 61, a cooling passage is formed so as to allow the cooling air to flow in through the coolant introduction port 62a into the holding case 61, to circulate over the longitudinal direction in the holding case 61, and to flow out through the coolant lead out port 64a.

As shown in FIG. 5, with respect to the cell block 40, in a state stored in the module case 2, the case front end surface section 62 is disposed so as to oppose the case front wall section 21, and the coolant introduction port 62a of the case front end surface section 62 opposes the suction port 22 of the case front wall section 21. Also, as shown in FIG. 4, the case back end surface section 64 is disposed so as to oppose the case back wall section 31, and the coolant lead out port 64a of the case back end surface section 64 opposes the exhaust port 32 of the case back wall section 31.

As shown in FIG. 3, the first cell block 41 and the second cell block 42 are formed so that the length thereof in the longitudinal direction is slightly shorter than the distance between the case front wall section 21 and the case back wall section 31 of the module case 2. Also, the first cell block 41 and the second cell block 42 are disposed respectively in positions displaced to the case back wall section 31 side in the module case 2, and, as shown in FIG. 4, the coolant lead out port 64*a* of the case back end surface section 64 and the exhaust port 32 of the case back wall section 31 are made a state directly communicating with each other, with the case back wall section 31 and the case back end surface section 64 being abutted upon each other. Under such a state, the case back wall section 31 and the case back end surface section 64 are securely attached to each other, and gas in the module case 2 can be prevented from leaking in. Further, a seal material may be interposed between the case back wall section 31 and the case back end surface section 64.

Also, as shown in FIG. 3 and FIG. 5, a communication member 71 is attached between the case front wall section 21 and the case front end surface section 62. The communication member 71 communicates the suction port 22 of the case front wall section 21 and the coolant introduction port 62*a* of the case front end surface section 62 with each other, and has a configuration of forming space regions 80A, 80B that continue in the lateral direction between the case front wall section 21 and the case front end surface section 62 and above and below the communication member 71 (outside the communication member).

Further, utilizing the space regions 80A, 80B as wiring passages, wiring connecting the first-third cell blocks 41 to 43 and the control unit 4 to each other is passed. As the wiring that is passed through the space regions 80A, 80B, a harness 54 connecting the negative electrode terminal 43B of the third cell block 43 and the control unit 4 to each other, the voltage detection line 55 transmitting a detection signal of the voltage of the respective cell blocks 41 to 43 to the control unit 4, the sensor line 56 transmitting a detection signal of the temperature detection sensor 45 to the control unit 4, and the like are included.

<Communication Member>

Next, a structure of the communication member in the present embodiment will be described in detail using FIG. 6 and FIG. 7.

Figure 6:
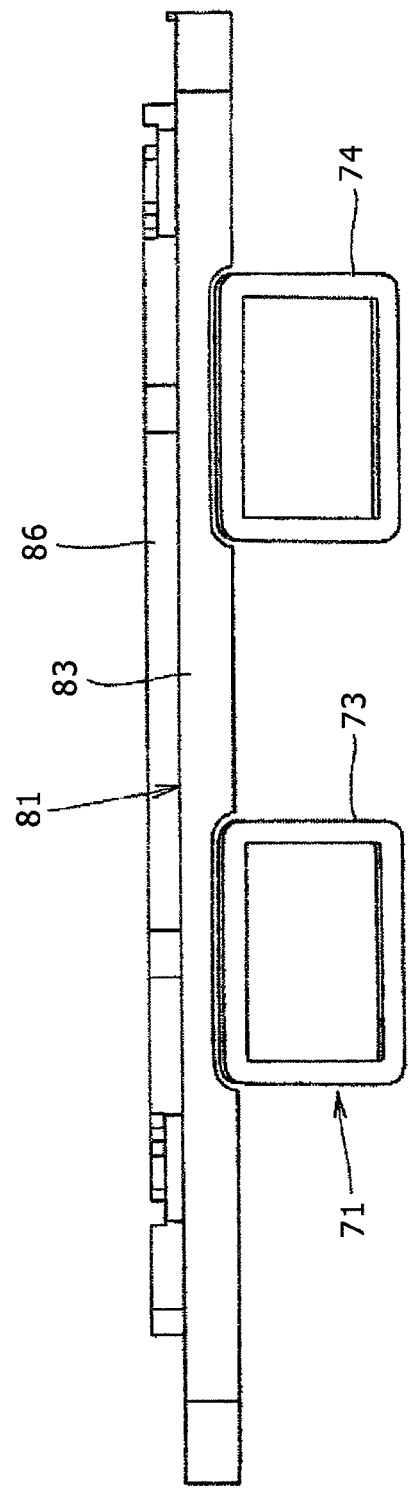
FIG. 6 is a front view of a communication member.
Figure 7:
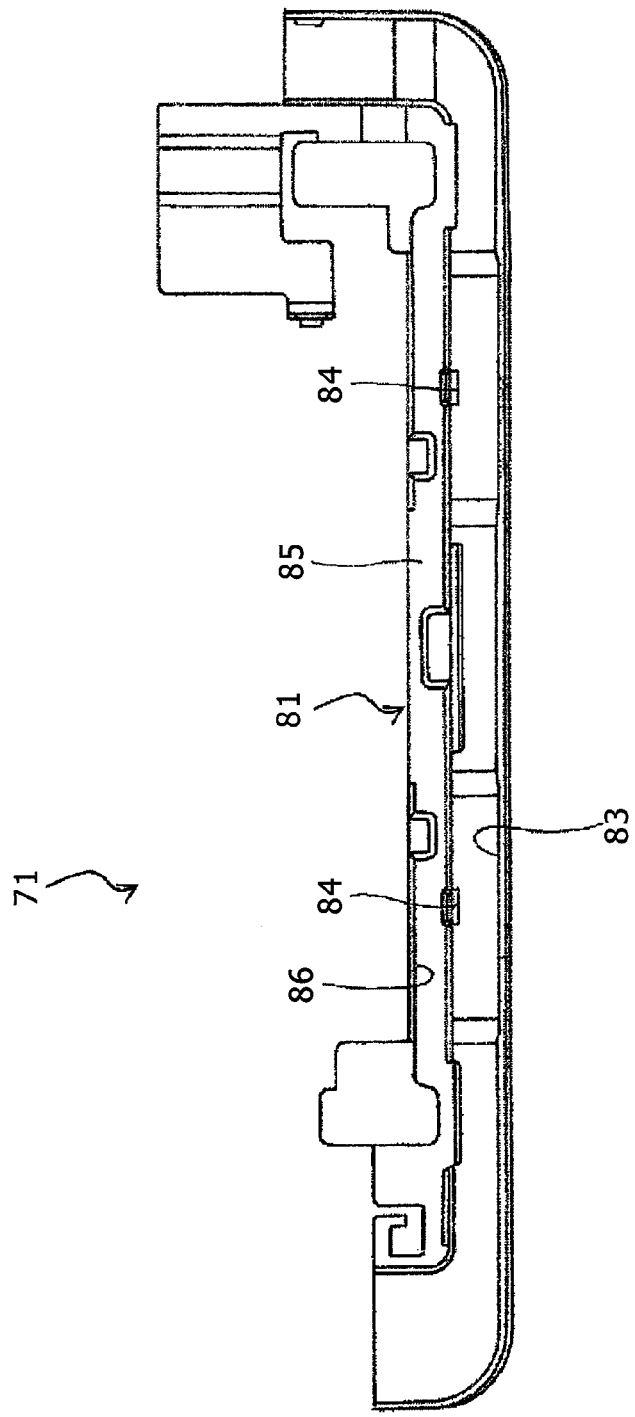
FIG. 7 is a plan view of the communication member.

FIG. 6 is a front view of the communication member, and FIG. 7 is a plan view of the communication member.

As shown in FIG. 6 and FIG. 7, the communication member 71 communicates the suction port 22 of the case front wall section 21 and the coolant introduction port 62*a* of the case front end surface section 62 with each other, and a holder 81 has a configuration of holding the communication member 71 at its communication position. The communication member 71 includes a first communication member 73 that is interposed between the case front wall section 21 and the case front end surface section 62 of the first cell block 41, and a second communication member 74 that is interposed between the case front wall section 21 and the case front end surface section 62 of the second cell block 42.

As shown in FIG. 5 and FIG. 6 for example, the first communication member 73 and the second communication member 74 have a frame shape in which the upstream end surface contacts the periphery of the suction port 22 of the case front wall section 21, and the downstream end surface contacts the periphery of the coolant introduction port 62*a* of the each case front end surface section 62 of the first cell block 41 and the second cell block 42. Also, the first communication member 73 and the second communication member 74 are configured to be securely attached to the case front wall section 21 and the case front end surface section 62 and to prevent gas in the module case 2 from leaking in. Further, a seal material may be arranged in a gap between the case front wall section 21 and a gap between the case front end surface section 62 for sealing.

The first communication member 73 and the second communication member 74 have a dimension and a shape that restrict movement in the longitudinal direction of the cell blocks 41, 42 in the inside of the module case 2 for positioning. Also, the first communication member 73 and the second communication member 74 form the upper space region 80A and the lower space region 80B that continue in the lateral direction of the module case 2 between the case front wall section 21 and the case front end surface section 62 and above and below the first communication member 73 and the second communication member 74 over between the first cell block 41 and the second cell block 42. The lower space region 80B has a size that enables wiring of the voltage detection line 55 of the respective cell blocks 41 to 43.

As shown in FIG. 6, the holder 81 has a configuration of extending along the upper part of the first communication member 73 and the second communication member 74 and holding the first communication member 73 and the second communication member 74.

As shown in FIG. 5, the holder 81 has a long bar shape continuously extending in the lateral direction over the gap between the first cell block 41 and the second cell block 42 in the inside of the upper space region 80A, and has such a length dimension that one end thereof is disposed at a position in the vicinity of the negative electrode terminal 43B of the third cell block 43 and the other end thereof is disposed in the control unit storage area 2B.

By being attached to the upper space region 80A, the holder 81 disposes the first communication member 73 and the second communication member 74 so as to position the same at a position communicating the suction port 22 of the case front wall section 21 and the coolant introduction port 62*a* of the case front end surface section 62 with each other.

The holder 81 includes a first wiring passage 83 extending along the longitudinal direction. The first wiring passage 83 has a groove shape having a generally U shape cross section that opens upward, and the harness 54 is stored therein in the present embodiment.

In the holder 81, the front face thereof opposes the case front wall section 21, the back face thereof opposes the case front end surface section 62, and recess sections 84 for locking and a flange 85 are arranged in the back face thereof. When the communication member 71 is inserted from the above to the space region between the case front wall section 21 and the case front end surface section 62, the recess sections 84 for locking are locked by the first cell block 41 and the second cell block 42, fixes the communication member 71, and restricts upward movement of the communication member 71.

The present embodiment has such a configuration that locking claws 63 projecting from the case front end surface section 62 enter the recess sections 84 and are locked, and the communication member 71 can be detached by releasing locking of the locking claws 63. Therefore, attaching and detaching work can be executed easily, and the assembly work and the maintenance work of the lithium ion battery device 1 are facilitated.

The flange 85 has a shape of projecting backward so as to line the upper surface of the cell block 40 from the back surface upper end of the holder 81 and extending along the holder 81 with a predetermined width, and is configured to be capable of covering and hiding the upper surface of the bus bar 51. Thus, for example, when a service person opens the upper cap section 12 for maintenance and the like, exposure of the bus bar 51 is prevented, to touch the bus bar 51 carelessly is prevented, and safety can be ensured.

In the upper part of the flange 85, a second wiring passage 86 is arranged as shown in FIG. 5. The second wiring passage 86 extends along the longitudinal direction of the holder 81, has a shallow groove shape that opens upward, and, in the present embodiment, is configured so as to be capable of storing the sensor line 56 such as a thermistor line and the like for wiring.

According to the communication structure having the configuration, the space regions 80A, 80B can be formed between the case front wall section 21 and the case front end surface section 62 and outside the communication member 71, and wiring between the respective cell blocks 41 to 43 and the control unit 4 can be gathered together in the space regions 80A, 80B. Therefore, compared to prior arts in which wiring is executed above the cell blocks, the dimension in the height direction of the total lithium ion battery device 1 can be reduced, and the space can be saved. Thus, application to the vehicle interior for example where restriction in the height direction is larger than that in the lateral direction is allowed, and wider vehicle interior space can be secured.

Also, because the respective wirings 55, 54, 56 can be held at constant positions, even when impact such as vibration and the like is applied, an excess force can be prevented from being applied to the connection section of wiring. Therefore, the damage and the like of the connector section can be prevented, durability can be improved, and the specification that stands use for a long period of time can be achieved.

Further, because wiring of the voltage detection line 55 can be separated only by wiring the voltage detection line 55 between the case front wall section 21 and the case front end surface section 62 and attaching the communication member 71 and the voltage detection line 55 can be held in the lower space region 80B, it is not necessary to fix the voltage detection line 55 to the lower cap section 11 or to the cell blocks 40 using separate components, the number of components can be reduced, and assembling work can be facilitated.

Also, in the wiring structure described above, description was made with an example of a case of passing each wiring of the voltage detection line 55, the harness 54, and the sensor line 56 through the lower space region 80B, the first wiring passage 83 and the second wiring passage 86, however, at least one wiring may be passed, the each wiring of the voltage detection line 55, the harness 54, and the sensor line 56 described above is not necessarily to be disposed so as to be passed through the lower space region 80B, the first wiring passage 83 and the second wiring passage 86, and it is also possible to exchange the location each other.

<Cell Block>

Next, a configuration of the cell block in the present embodiment will be described in detail using FIG. 8 to FIG. 15.

Figure 8:
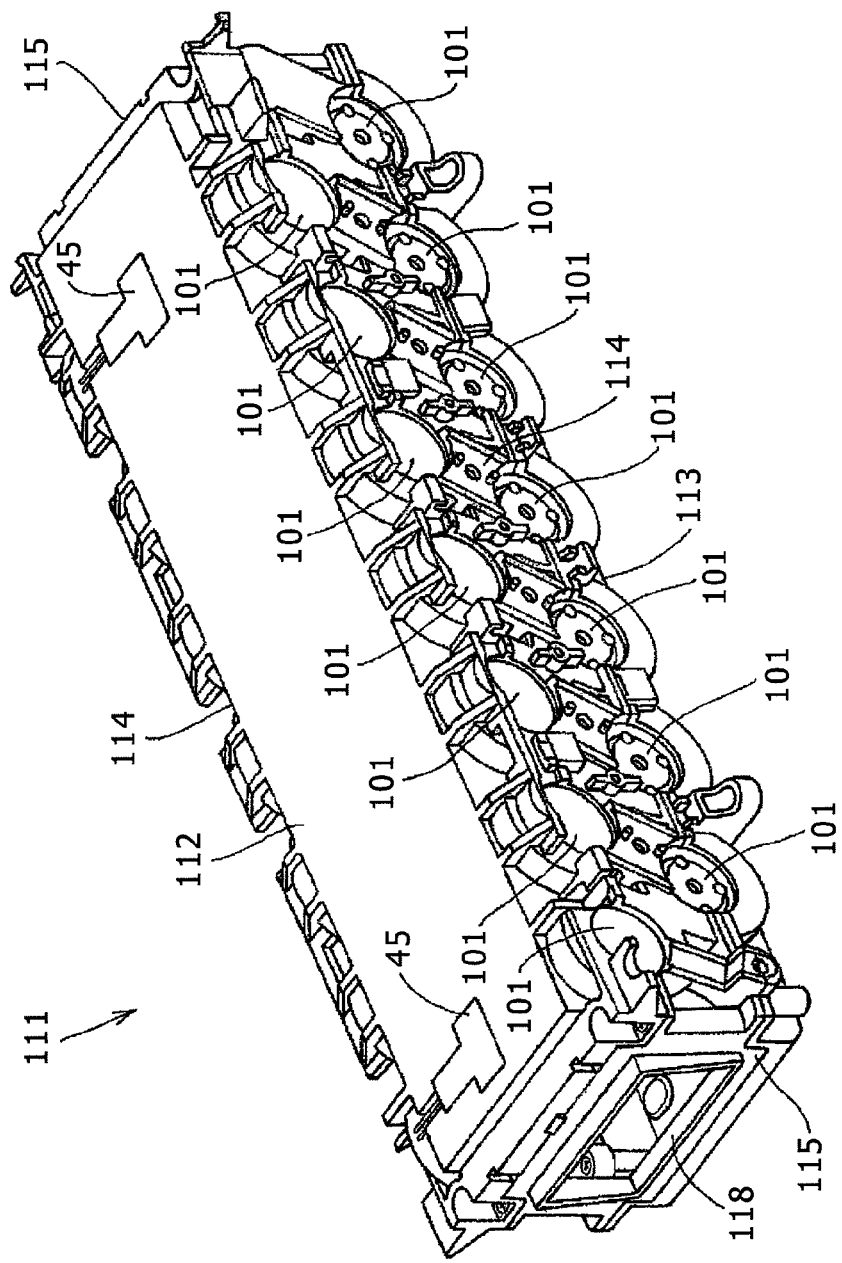
FIG. 8 is a drawing showing a state plural battery cells are held by a holding case.
Figure 9:
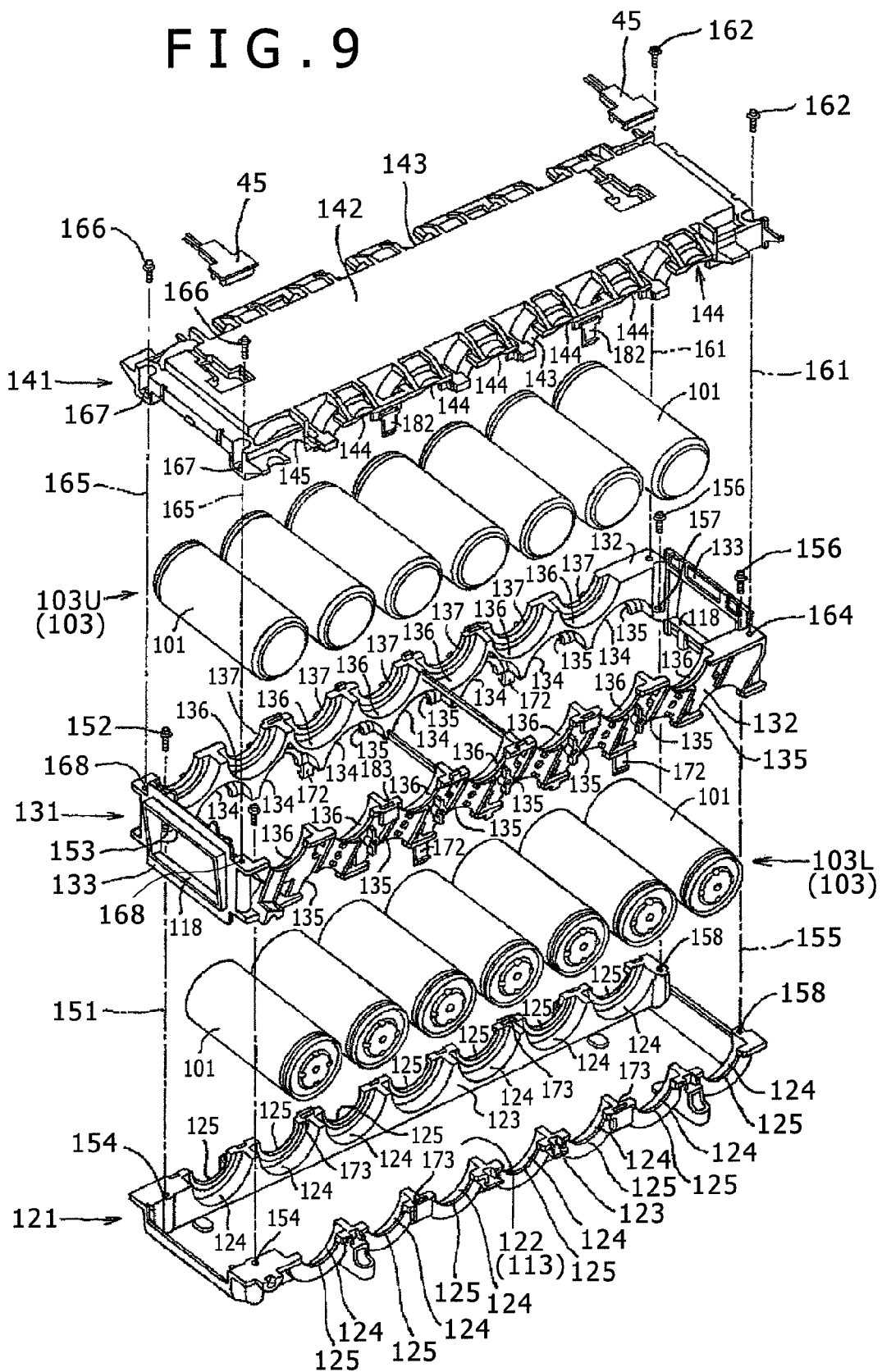
FIG. 9 is an exploded perspective view of FIG. 8.
Figure 10:
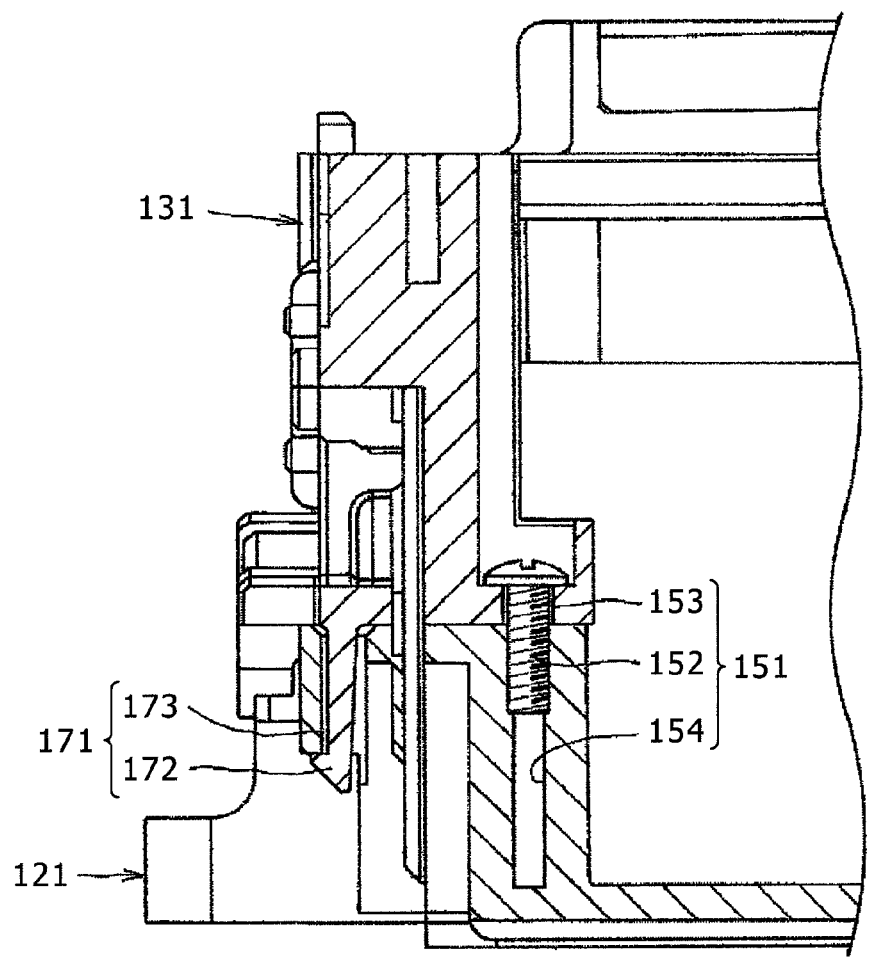
FIG. 10 is a cross-sectional view explaining a joining structure of a lower holding frame member and a middle holding frame member.
Figure 11:
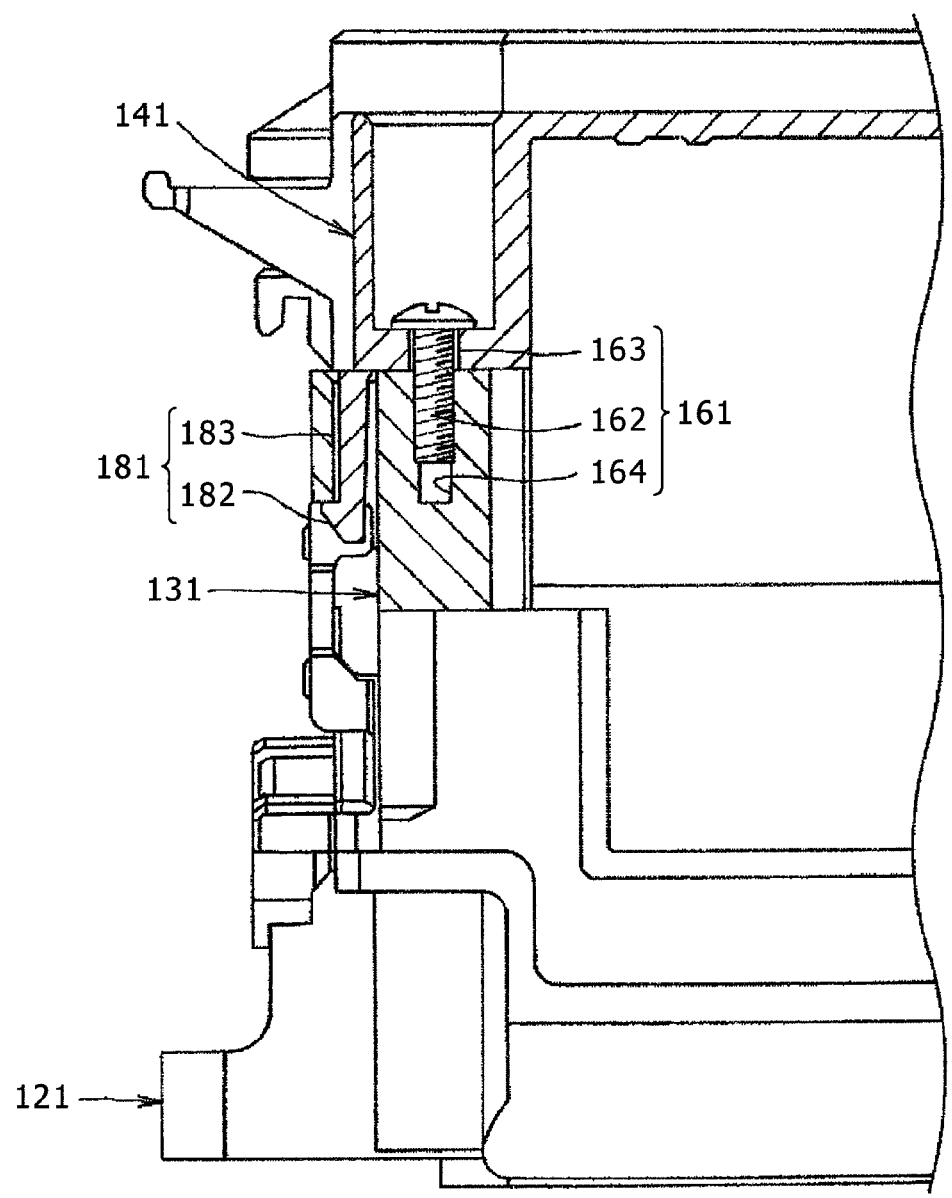
FIG. 11 is a cross-sectional view explaining a joining structure of the middle holding frame member and an upper holding frame member.
Figure 12:
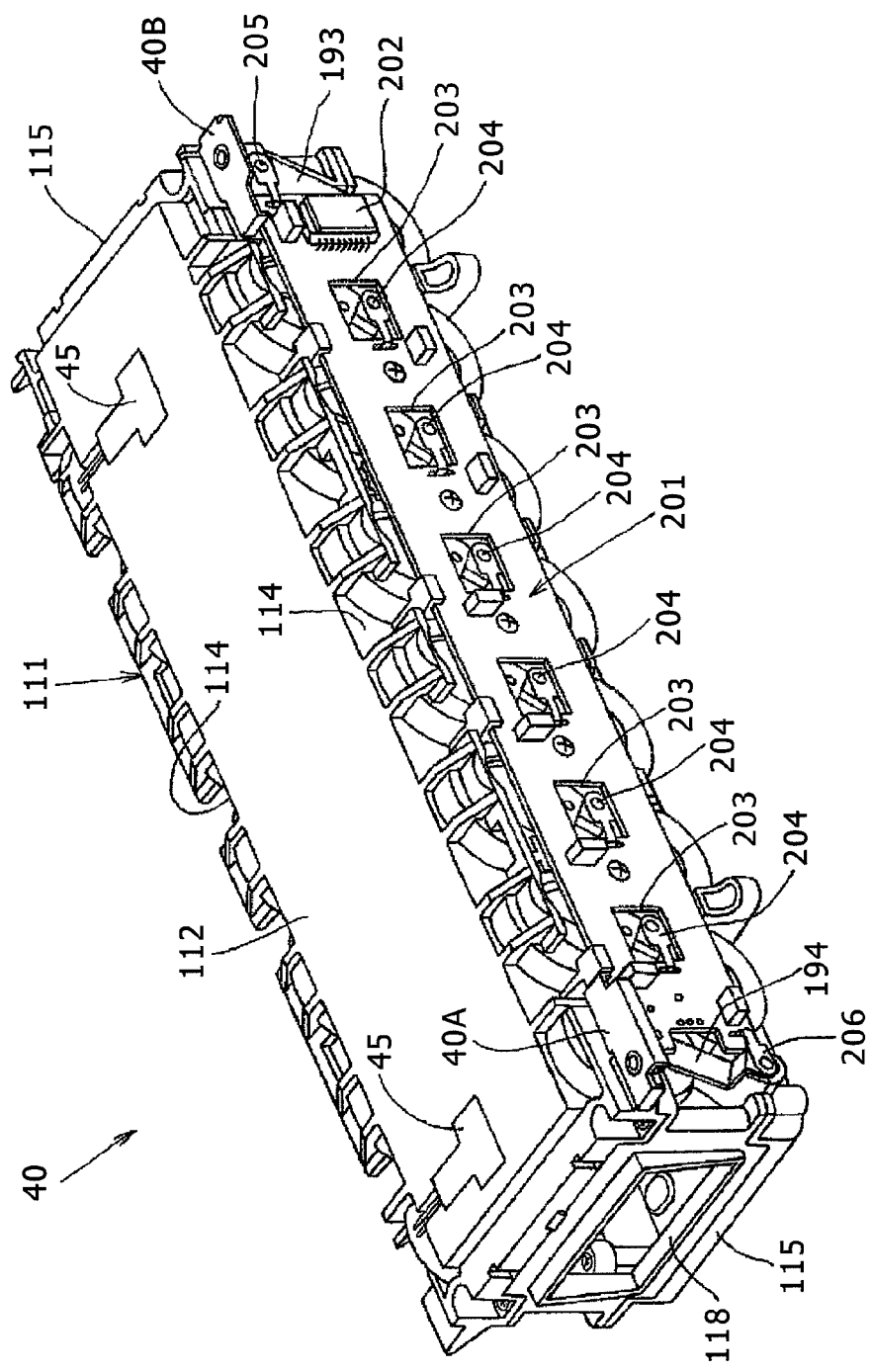
FIG. 12 is a perspective view showing an assembly completion state of a cell block.
Figure 13:
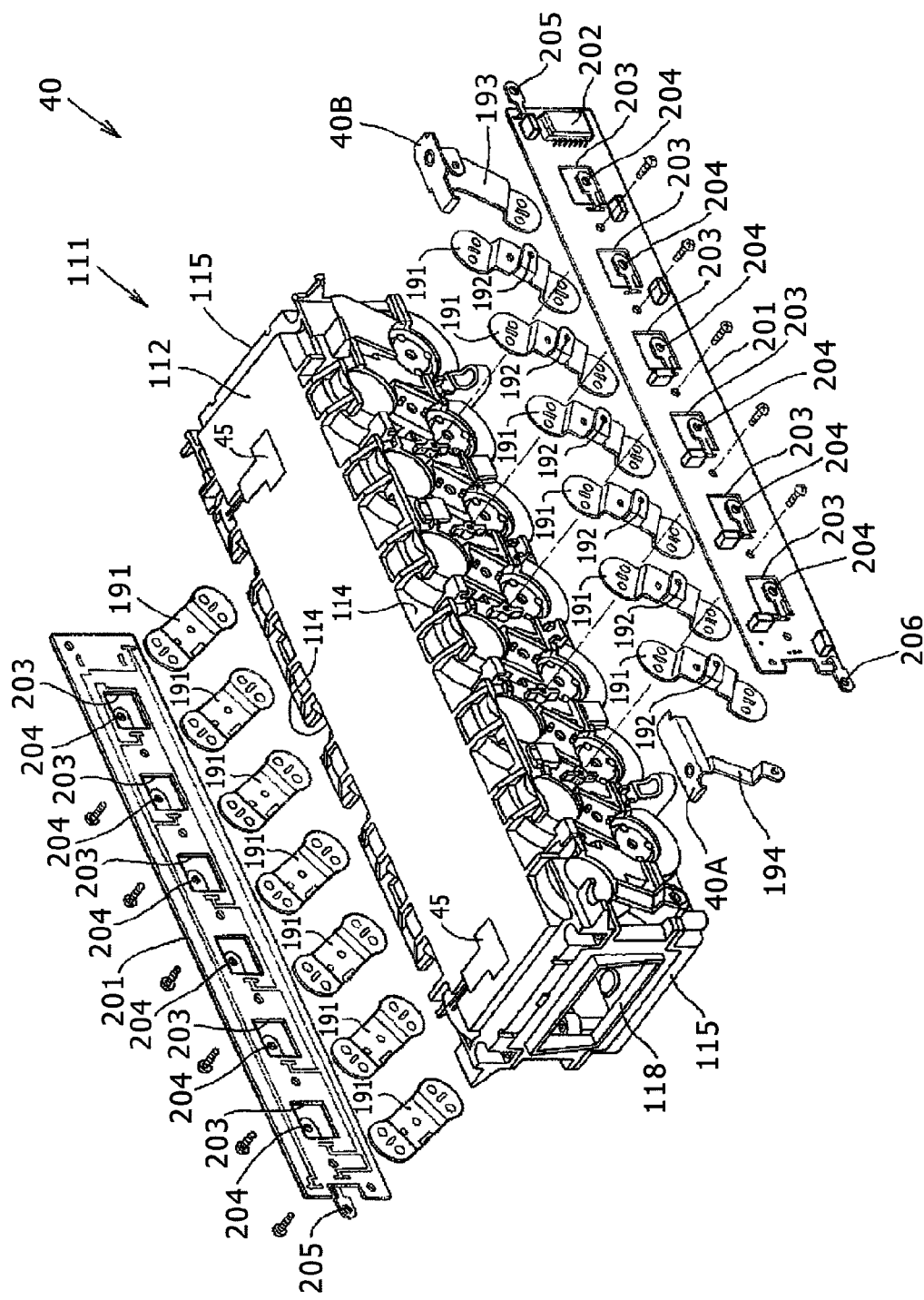
FIG. 13 is an exploded perspective view explaining an attaching structure of conducting members and a voltage detection substrate.

FIG. 8 is a drawing showing a state in which plural battery cells are held by a holding case, FIG. 9 is an exploded perspective view of FIG. 8. FIG. 10 is a cross-sectional view explaining a joining structure of a lower holding frame member and a middle holding frame member, FIG. 11 is a cross-sectional view explaining a joining structure of the middle holding frame member and an upper holding frame member, FIG. 12 is a perspective view showing an assembly completion state of a cell block, FIG. 13 is an exploded perspective view explaining an attaching structure of conducting members and a voltage detection substrate, FIG. 14 is a drawing showing an example of a method for attaching the voltage detection substrate, and FIG. 15 is a drawing showing another example of a method for attaching the voltage detection substrate.

Figure 14:
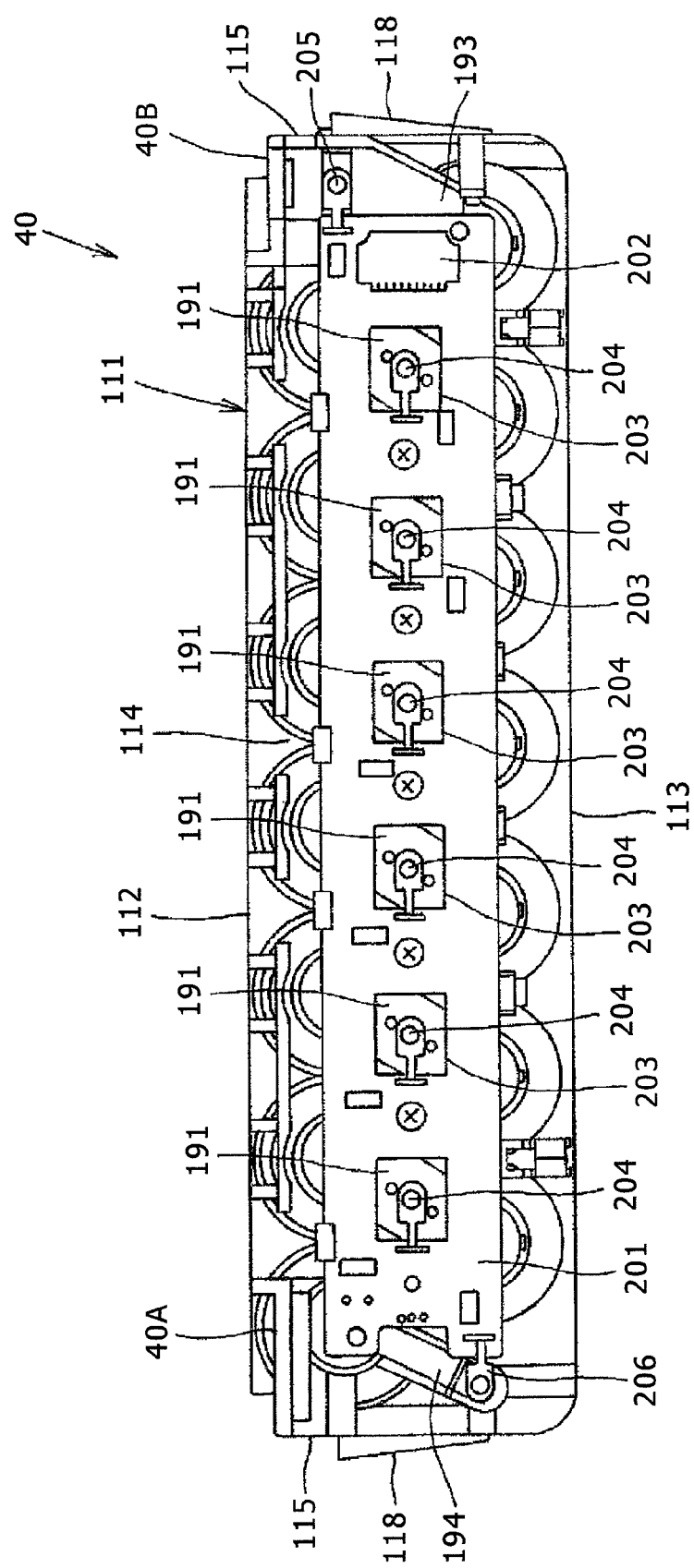
FIG. 14 is a drawing showing an example of a method for attaching the voltage detection substrate.
Figure 15:
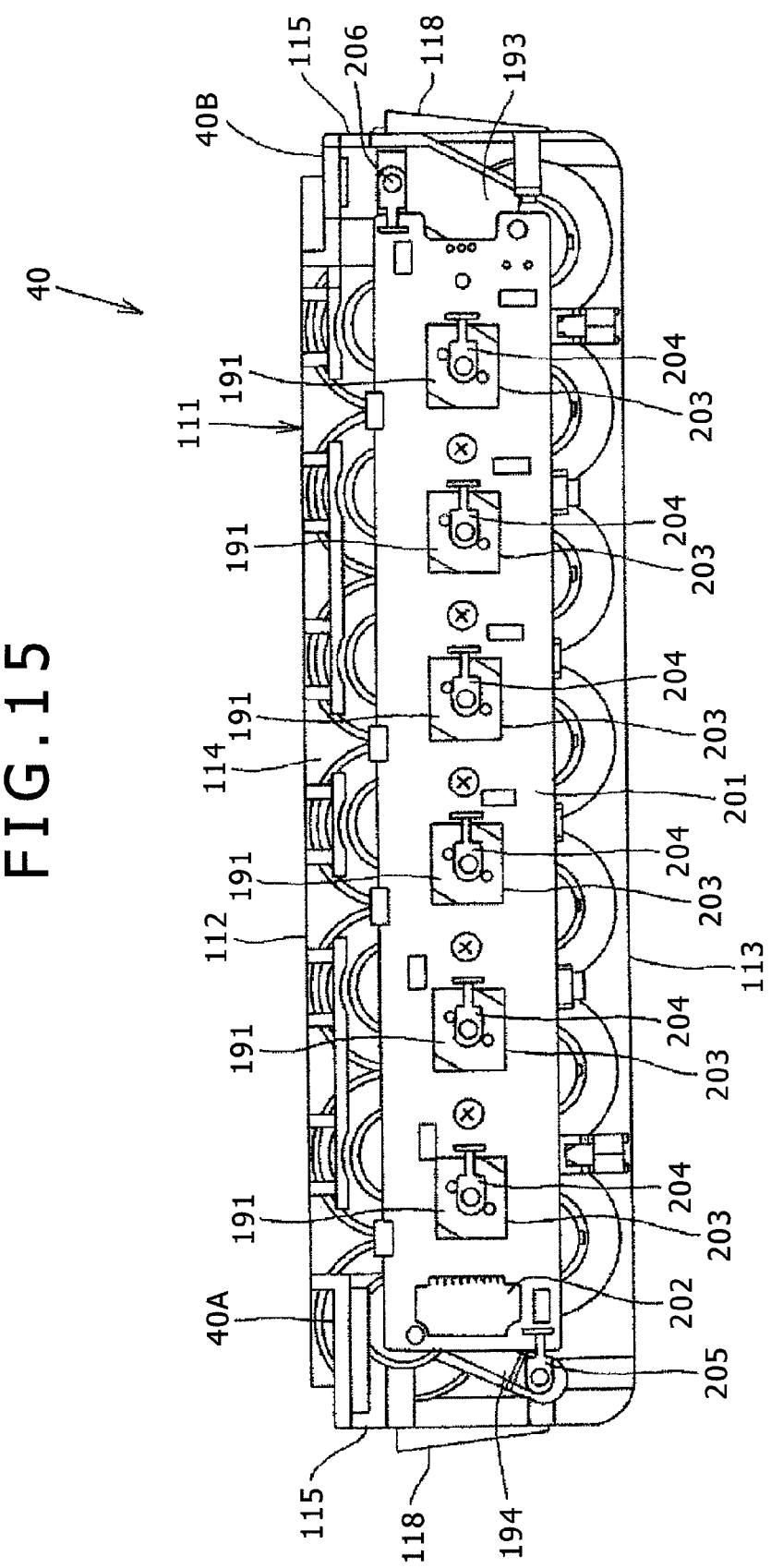
FIG. 15 is a drawing showing another example of a method for attaching the voltage detection substrate.

Out of the cell blocks 40, the first cell block 41 and the second cell block 42 have a same configuration except that the direction of attaching a voltage detection substrate 201 is different each other as shown in FIG. 14 and FIG. 15 for example, and are disposed in the module case 2 arrayed so that the positions of the positive electrode terminals 41A, 42A and the negative electrode terminals 41B, 42B become opposite to each other. On the other hand, the third cell block 43 has a configuration different in terms that the number of pieces of the power cells 101 is 12 against 14 each in the first cell block 41 and the second cell block 42. Also, the direction and the position for disposal in the module case 2 have been determined to be one. In the description below, a configuration of the cell block 40 will be described with an example of a case of the first cell block 41 and the second cell block 42.

The cell block 40 has a configuration of forming a battery pack by holding the plural battery cells 101 in a holding case 111 and electrically connecting the respective battery cells 101 in series by conductor members. For the battery cells 101, lithium ion battery cells are used.

The battery cell 101 is a structural body having a cylindrical shape and is configured to store constituting components such as a battery element, safety valves and the like in a battery container to which an electrolytic solution has been poured. The safety valve on the positive electrode side is a cleavage valve that cleaves when the pressure of the inside of the battery container reaches a predetermined pressure by abnormality such as overcharging and the like. The safety valve functions as a fuse mechanism that disconnects electric connection between a battery cap and the positive electrode side of the battery element by cleavage, and functions as a pressure reduction mechanism that ejects gas that is mist-like carbonate-based gas (ejected object) containing the electrolytic solution generated in the inside of the battery container to the outside of the battery container.

A cleavage groove is arranged also on the negative electrode side of the battery container, and cleaves when the pressure of the inside of the battery container reaches a predetermined pressure by abnormality such as overcharging and the like. Thus, the gas generated in the inside of the battery container can be ejected from the negative electrode terminal side also. The nominal output voltage of the lithium ion battery cell 101 is 3.0 to 4.2 volts, and the average nominal output voltage is 3.6 volts.

As shown in FIG. 8, the holding case 111 has a hexahedron shape having a long axis, and includes an upper surface section 112 and a lower surface section 113 departing from and opposing each other in the vertical direction and extending in the longitudinal direction with a generally constant width, a pair of vertical wall surface sections 114, 114 departing from and opposing each other in the short side direction and extending between respective long side sections of the upper surface section 112 and the lower surface section 113, and a pair of end surface sections 115, 115 departing from and opposing each other in the longitudinal direction and extending between respective short side sections of the upper surface section 112, the lower surface section 113 and the pair of vertical wall surface sections 114, 114.

The holding case 111 has a configuration of holding battery cell arrayed bodies 103 in a state arrayed stackingly, the battery cell arrayed body 103 being obtained by that the battery cells 101 are tipped sideways and plural pieces thereof are disposed in parallel so that the axes of the battery cells 101 extend along the gap between the pair of end surface sections 115, 115 that are in the short side direction of the holding case 111.

The first cell block 41 and the second cell block 42 have a configuration of holding the battery cells 101 so as to array 7 pieces in the row direction and 2 steps or 2 layers in the height direction in a stacked state. Also, the third cell block 43 has a configuration of holding the battery cells 101 so as to array 6 pieces in the row direction and 2 steps or 2 layers in the height direction in a stacked state although it is not illustrated particularly.

A battery cell arrayed body 103L of the lower layer and a battery cell arrayed body 103U of the upper layer are held in a state displaced in the row direction from each other, and, in the present embodiment, are held in a state shifted by a half piece portion in the longitudinal direction of the holding case 111. By holding the battery cell arrayed body 103L of the lower layer and the battery cell arrayed body arrayed body 103U of the upper layer in a state displaced in the row direction thus, the battery cell arrayed body 103L of the lower layer and the battery cell arrayed body 103U of the upper layer can be brought closer to each other, and the dimension in the direction orthogonal to the row direction can be shortened. Therefore, the height direction as the total battery pack can be lowered, and the height of the cell block 40 can be lowered.

The battery cell arrayed body 103L of the lower layer and the battery cell arrayed body 103U of the upper layer are arrayed so that the directions of the positive electrode and the negative electrode of the respective battery cells 101 become opposite to each other, the battery cell arrayed body 103L of the lower layer is held so that the positive electrodes of the respective battery cells 101 are positioned on one side in the short side direction of the holding case 111, and the battery cell 103U of the upper layer is held so that the negative electrodes of the respective battery cells 101 are positioned on the other side in the short side direction of the holding case.

The holding case 111 is composed of three members of a lower holding frame member 121, a middle holding frame member 131 and an upper holding frame member 141, and has a configuration of tucking and holding the battery cell arrayed body 103L of the lower layer by the lower holding frame member 121 and the middle holding frame member 131, and tucking and holding the battery cell arrayed body 103U of the upper layer by the middle holding frame member 131 and the upper holding frame member 141.

In the holding case 111, in an assembled state, cooling passages to which the respective battery cells 101 are exposed and which extend in the longitudinal direction are formed in the inside of the case, and opening sections 118, 118 that communicate with both ends of the passage section respectively are formed in the pair of the end surface sections 115, 115 that constitute the case front end surface section 62 and the case back end surface section 64 of the holding case 111.

With respect to the respective opening sections 118, 118, one opening section 118 becomes the coolant introduction port 62a or the coolant lead out port 64a and the other opening section 118 becomes the coolant lead out port 64a or the coolant introduction port 62a according to the direction of mounting the cell block 40 in the module case 2, that is, depending on for which of the first cell block 41 or the second cell block 42 the cell block 40 is used (refer to FIG. 3 to FIG. 5). In the present embodiment, the opening section 118 on the positive electrode terminal 41A side becomes the coolant introduction port 62a and the opening section 118 on the negative electrode terminal 41B side becomes the coolant lead out port 64a in the first cell block 41, whereas the opening section 118 on the negative electrode terminal 42B side becomes the coolant introduction port 62a and the opening section 118 on the positive electrode terminal 42A side becomes the coolant lead out port 64a in the second cell block 42.

The lower holding frame member 121 includes a lower surface section 122 of a flat sheet shape which extends with a constant lateral width, and a pair of lower vertical wall surface sections 123, 123 that stand upward from both side ends in the short side direction of the lower surface section 122 and oppose each other. The lower surface section 122 of the lower holding frame member 121 constitutes the lower surface section 113 of the holding case 111, and the lower vertical wall surface sections 123, 123 constitute the lower portions of the vertical wall surface sections 114, 114 of the holding case 111.

In the pair of lower vertical wall surface sections 123, 123, lower layer bottom holding sections 124 that respectively hold the lower side portion of the battery cells 101 that constitute the battery cell arrayed body 103L of the lower layer and opening window sections 125 that respectively expose the end surface on both sides in the axial direction of the battery cells 101 held by the lower layer bottom holding sections are arranged. Each of the lower layer bottom holding sections 124 includes a lower layer bottom recessed surface cut into a semi-arc shape from the upper side section of the lower vertical wall surface sections 123, 123 toward the lower surface section 122 so as to contact the outer peripheral surface of the end of the battery cell 101 and an opposing surface that opposes the end surface in the axial direction of the battery cell 101, and constitutes a bottom holding section that holds the battery cell arrayed body 103L of the lower layer in a state restricting movement of the battery cell 101 in its axial direction and radial direction by joint work with lower layer top holding section 134 of middle vertical wall surface sections 132, 132 described below.

The opening window sections 125 are formed so as to open in the lower vertical wall surface sections 123, 123, and are configured to be capable of exposing the center portion of the end surface of the battery cell 101 held by the lower layer bottom holding section 124 to the side of the holding case 111.

The middle holding frame member 131 includes the pair of middle vertical wall surface sections 132, 132 that extend with a constant height width and oppose each other, and a pair of end surface sections 133, 133 arranged over between the short side sections in both ends in the longitudinal direction of the middle vertical wall surface sections 132, 132. By overlaying the middle holding frame member 131 on top of the lower holding frame member 121 and joining the both, the respective middle vertical wall surface sections 132, 132 are connected so as to continue to the upper part of the respective lower vertical wall surface sections 123, 123 of the lower holding frame member 121, and constitute the center portion in the height direction of the vertical wall surface sections 114, 114 of the holding case 111. Also, the respective end surface sections 133, 133 of the middle holding frame members 131, 131 constitute the respective end surface sections 115, 115 of the holding case 111.

In the pair of middle vertical wall surface sections 132, 132, the lower layer top holding sections 134 that respectively hold the upper portions of the battery cells 101 held by the lower holding frame member 121, and upper layer bottom holding sections 136 that respectively hold the lower portions of the battery cells constituting the battery cell arrayed body of the upper layer are arranged. Also, opening window sections 135, 137 that expose the end surfaces on both sides in the axial direction of the battery cells 101 held by the lower layer top holding sections 134 and the end surfaces on both sides in the axial direction of the battery cells 101 held by the upper layer bottom holding sections 136 respectively are arranged.

Each of the lower layer top holding sections 134 includes a lower layer top recessed surface cut into a semi-arc shape from the lower side section of the middle vertical wall surface section 132 toward the upper side section so as to contact the outer peripheral surface of the end of the battery cell 101 and an opposing surface that opposes the end surface in the axial direction of the battery cell 101, and constitutes a bottom holding section that holds the battery cell arrayed body 103L of the lower layer in a state of restricting movement of the battery cell 101 in the axial direction and radial direction by joint work with the lower layer bottom holding section 124 of the lower holding frame member 121.

Each of the upper layer bottom holding sections 136 includes an upper layer bottom recessed surface cut into a semi-arc shape from the upper side section of the middle vertical wall surface section 132 toward the lower side section so as to contact the outer peripheral surface of the end of the battery cell 101 and an opposing surface that opposes the end surface in the axial direction of the battery cell 101, and constitutes a top holding section that holds the battery cell arrayed body 103U of the upper layer in a state of restricting movement of the battery cell 101 to the axial direction and radial direction by joint work with an upper layer top holding section 144 of the upper holding frame member 141 described below.

The respective lower layer top holding sections 134 and the respective upper layer bottom holding sections 136 are disposed at positions shifted from each other by a half piece portion in the longitudinal direction of the middle holding frame member 131 in order to hold the battery cell arrayed body 103L of the lower layer and the battery cell arrayed body 103U of the upper layer in a state displaced from each other in the row direction, and it is configured that the center of the upper layer bottom holding section is positioned between the lower layer top holding sections 134 that adjoin each other. Also, it is configured that the height of the middle vertical wall surface sections 132 becomes shorter than the diameter of the battery cell 101.

The upper holding frame member 141 includes an upper surface section 142 of a flat sheet shape which extends with a constant lateral width, and a pair of upper vertical wall surface sections 143, 143 that hang downward from both side ends in the short side direction of the upper surface section 142 and oppose each other. The upper surface section 142 of the upper holding frame member 141 constitutes the upper surface section 112 of the holding case 111, and the upper vertical wall surface sections 143, 143 constitute the upper portions of the vertical wall surface sections 114 of the holding case 111.

In the pair of upper vertical wall surface sections 143, 143, the upper layer top holding sections 144 that respectively hold the upper portion of the battery cells 101 that constitute the battery cell arrayed body 103U of the upper layer and opening window sections 145 that expose the end surfaces on both sides in the axial direction of the battery cells 101 held by the upper layer top holding sections 144 respectively are arranged.

Each of the upper layer top holding sections 144 includes an upper layer top recessed surface cut into a semi-arc shape from the lower side section of the upper vertical wall surface sections 143, 143 toward the upper surface section 142 so as to contact the outer peripheral surface of the end of the battery cell 101 and an opposing surface that opposes the end surface in the axial direction of the battery cell 101, and constitutes a top holding section that holds the battery cell arrayed body 103U of the upper layer in a state of restricting movement of the battery cell 101 in the axial direction and radial direction by joint work with the upper layer bottom holding section 136 of the middle holding frame member 131.

The opening window sections 145 are formed so as to open in the upper vertical wall surface sections 143, 143, and are configured to be capable of exposing the center portion of the end surface of the battery cells 101 held by the upper layer top holding sections 144 to the side of the holding case 111.

The holding case 111 includes a lower joining means that joins the lower holding frame member 121 and the middle holding frame member 131 each other, and an upper joining means that joins the middle holding frame member 131 and the upper holding frame member 141 each other. The lower holding frame member 121 and the middle holding frame member 131 are joined each other by the lower joining means in a state the middle holding frame member 131 is overlaid on top of the lower holding frame member 121, and the middle holding frame member 131 and the upper holding frame member 141 are joined each other by the upper joining means in a state the upper holding frame member 141 is overlaid on top of the middle holding frame member 131.

The lower joining means includes lower fastening sections 151, 155 and lower locking sections 171, and the upper joining means includes upper fastening sections 161, 165 and upper locking sections 181.

As shown in FIG. 9, the lower fastening sections 151, 155 are arranged so as to depart from each other in both ends in the longitudinal direction of the holding case 111 and form pairs in the short side direction, and the lower locking sections 171 are arranged so as to form pairs in the short side direction at positions closer to the center in the longitudinal direction.

The lower fastening sections 151, 155 include lower fastening screws 152, 156, screw insertion holes 153, 157 penetratingly formed in the middle holding frame member 131, and screwing holes 154, 158 bored in the lower holding frame member 121, and have a structure in which the lower holding frame member 121 and the middle holding frame member 131 are joined each other by attaching the lower fastening screws 152, 156 from above the middle holding frame member 131 in a state the middle holding frame member 131 is overlaid on top of the lower holding frame member 121 (in FIG. 10, only the lower fastening section 151 is shown).

The lower fastening section 151 is arranged on the positive electrode terminal 40A side (refer to FIG. 12) that is one side in the longitudinal direction of the holding case 111. The lower fastening section 151 is disposed at a position below the battery cell 101 that projects to one side in the row direction beyond the battery cell arrayed body 103L of the lower layer out of the battery cells 101 constituting the battery cell arrayed body 103U of the upper layer, and joins the lower holding frame member 121 and the middle holding frame member 131 each other by fastening.

That is, in this lower fastening section 151, the battery cell arrayed body 103U of the upper layer is arranged on the side projecting in the row direction beyond the battery cell arrayed body 103L of the lower layer, and the screw insertion hole 153 and the screwing hole 154 are disposed at a position below the upper layer bottom holding section 136 that is positioned at the outermost side in the longitudinal direction of the middle holding frame member (refer to FIG. 4 for example).

As described above, the lower layer top holding section 134 of the middle holding frame member 131 is formed at a position shifted by a half piece portion of the battery cell 101 to the negative electrode terminal 40B side of the upper layer bottom holding section 136 that is the side the battery cell arrayed body 103L of the lower layer projects in the row direction beyond the battery cell arrayed body 103U of the upper layer, and a middle vertical wall portion 132a where the lower layer top holding section 134 of the middle holding frame member 131 does not exist by the length of generally a half piece portion of the battery cell 101 is formed at a position below the upper layer bottom holding sections 136 that is positioned on the most positive electrode terminal 40A side of the middle holding frame member 131. Further, in the lower holding frame member 121 therebelow also, a lower vertical wall portion 123a where the lower layer bottom holding section 124 does not exist is formed so as to continue.

Therefore, by arranging the lower fastening section 151 in the middle vertical wall portion 132a and the lower vertical wall portion 123a, the lower fastening section 151 can be prevented from being disposed on the outside in the longitudinal direction of the upper layer bottom holding section 136 that is positioned on the most positive electrode terminal side of the middle holding frame member 131, that is the further outer side in the row direction of the battery cell 101 that projects in the row direction.

Accordingly, compared with a case three holding frame members of the lower holding frame member 121, the middle holding frame member 131 and the upper holding frame member 141 are penetrated vertically and are fastened together by one screw, the length in the longitudinal direction of the holding case 111 can be shortened. Therefore, the cell blocks 40 can be miniaturized, and a space region for wiring can be formed between the case front wall section 21 and the case front end surface section 62.

As shown in FIG. 10, the lower locking section 171 includes a middle locking claw 172 that projects downward from the middle holding frame member 131 and a lower locking hole 173 formed in the lower holding frame member 121, and has a structure of joining the lower holding frame member 121 and the middle holding frame member 131 each other by overlaying the middle holding frame member 131 on top of the lower holding frame member 121 and inserting the middle locking claw 172 into the lower locking hole 173 for locking.

As shown in FIG. 9, the upper fastening sections 161, 165 are arranged in both ends in the longitudinal direction of the holding case 111 so as to depart from each other and form pairs in the short side direction, and the upper locking sections 181 are arranged so as to form pairs in the short side direction at positions closer to the center in the longitudinal direction.

The upper fastening sections 161, 165 include upper fastening screws 162, 166, screw insertion holes 163, 167 penetratingly formed in the upper holding frame member 141, and screwing holes 164, 168 bored in the middle holding frame member 131, and have a structure in which the middle holding frame member 131 and the upper holding frame member 141 are joined each other by attaching the upper fastening screws 162, 166 from above the upper holding frame member 141 in a state the upper holding frame member 141 is overlaid on top of the middle holding frame member 131 (in FIG. 11, only the upper fastening section 161 is shown).

The upper fastening section 161 is arranged on the negative electrode terminal 40B side (refer to FIG. 12) that is the other side in the longitudinal direction of the holding case 111. The upper fastening section 161 is disposed at a position above the battery cell 101 that projects to the other side in the row direction beyond the battery cell arrayed body 103U of the upper layer out of the battery cells 101 constituting the battery cell arrayed body 103L of the lower layer, and joins the middle holding frame member 131 and the upper holding frame member 141 to each other by fastening.

That is, in this upper fastening section 161, the battery cell arrayed body 103L of the lower layer is arranged on the side projecting in the row direction beyond the battery cell arrayed body 103U of the upper layer, and the screw insertion hole 163 and the screwing hole 164 are disposed at a position above the lower layer top holding section 134 that is positioned at the outermost side in the longitudinal direction of the middle holding frame member 131.

As described above, the upper layer bottom holding section 136 of the middle holding frame member 131 is formed at a position shifted by a half piece portion of the battery cell 101 to the positive electrode terminal 40A side of the lower layer top holding section 134 of the middle holding frame member 131 that is the side the battery cell arrayed body 103U of the upper layer projects in the row direction beyond the battery cell arrayed body 103L of the lower layer, and a middle vertical wall section 132a (refer to FIG. 5) where the upper layer bottom holding section 136 of the middle holding frame member 131 does not exist by the length of generally a half piece portion of the battery cell 101 is formed at a position above the lower layer top holding section 134 that is positioned on the most negative electrode terminal 40B side of the middle holding frame member 131. Further, in the upper holding frame member 141 thereabove also, an upper vertical wall portion 143a (refer to FIG. 5) where the upper layer top holding section 144 does not exist is formed continuously.

Therefore, by arranging the upper fastening section 161 in the middle vertical wall section 132a and the upper vertical wall portion 143a, the upper fastening section 161 can be prevented from being disposed on the outside in the longitudinal direction of the lower layer top holding section 134 that is positioned on the most negative electrode terminal 40B side of the middle holding frame member 131, that is the further outer side in the row direction of the battery cell 101 that projects in the row direction.

Accordingly, compared with a case the three holding frame members of the lower holding frame member 121, the middle holding frame member 131 and the upper holding frame member 141 are penetrated vertically and are fastened together by one screw, the length in the longitudinal direction of the holding case 111 can be shortened. Therefore, the cell block 40 can be miniaturized, and a space region for wiring can be formed between the case front wall section 21 and the case front end surface section 62.

As shown in FIG. 11, the upper locking section 181 includes an upper locking claw 182 that projects downward from the upper holding frame member 141 and a middle locking hole 183 formed in the middle holding frame member 131, and has a structure of joining the middle holding frame member 131 and the upper holding frame member 141 each other by overlaying the upper holding frame member 141 on top of the middle holding frame member 131 and locking the upper locking claw 182 to the middle locking hole 183.

Next, a method for assembling the holding case 111 having the configuration described above will be described below.

First, the battery cells 101 are inserted from above the lower holding frame member 121, and are respectively held by the respective lower layer bottom holding sections 124. The respective battery cells 101 are held so as to be lined up so that the positive electrodes of the respective battery cells 101 are positioned on one side in the short side direction of the holding case 111, and constitute the battery cell arrayed body 103L of the lower layer.

Next the middle holding frame member 131 is overlaid on top of the lower holding frame member 121, and the middle locking claw 172 of the lower locking section 171 is inserted into the lower locking hole 173 for locking. Then, the lower fastening screw 152 of the lower fastening section 151 is inserted into the screw insertion hole 153 of the middle holding frame member 131 from above the middle holding frame member 131, and is screwed into the screwing hole 154 of the lower holding frame member 121 for fastening. Thus, the lower holding frame member 121 and the middle holding frame member 131 are joined each other in a state the battery cells 101 are held between the lower holding frame member 121 and the middle holding frame member 131.

Also, the battery cells 101 are inserted from above the middle holding frame member 131, and are respectively held by the respective upper layer bottom holding sections 136 of the middle holding frame member 131. The respective battery cells 101 are lined up and held so that the positive electrode terminals of the respective battery cells 101 are positioned on the other side in the short side direction of the holding case 111.

Then, the upper holding frame member 141 is overlaid on top of the middle holding frame member 131, and the upper locking claw 182 of the upper locking section 181 is inserted into the middle locking hole 183 for locking. Also, the upper fastening screw 162 of the upper fastening section 161 is inserted into the screw insertion hole 163 of the upper holding frame member 141 from above the upper holding frame member 141 and is screwed into the screwing hole 164 of the middle holding frame member 131 for fastening. Thus, the middle holding frame member 131 and the upper holding frame member 141 are joined each other in a state the battery cells 101 are held between the middle holding frame member 131 and the upper holding frame member 141.

According to the method for assembling the holding case 111 described above, the holding case 111 can be assembled in order from the lower part of the holding case 111 toward the upper part without reversing the top and bottom of the lower holding frame member 121, the middle holding frame member 131 and the upper holding frame member 141 in the middle of assembling the holding case 111. Therefore, assembling of the cell blocks 40 can be facilitated, and the manufacturing cost can be reduced by reduction of the man-hours.

When the holding case 111 has been assembled and has been made a state shown in FIG. 8, then, conductive members 191 and the voltage detection substrates 201 are attached to the cell block 40.

The conductive members 191 electrically connect the respective battery cells 101 held in the holding case 111 in series to form a battery pack, and are attached to the vertical wall surface sections 114, 114 on both sides of the holding case 111 respectively as shown in FIG. 13.

Then, one end is electrically connected to the end of the each battery cell 101 of the lower layer, and the other end is electrically connected to the end of the each battery cell 101 of the upper layer positioned obliquely above in the longitudinal direction of the each battery cell 101 of the lower layer. In the generally center position of the conductive member 191, a connection terminal 192 for electrically connecting to the voltage detection terminal of the voltage detection substrate is arranged.

The positive electrode terminal 40A of the cell block 40 is connected to the electrode of the battery cell 101 disposed at a position projected in the longitudinal direction beyond the battery cell arrayed body 103L of the lower layer out of the battery cell arrayed body 103U of the upper layer. Also, the negative electrode terminal 40B of the cell block 40 is connected to the electrode of the battery cell 101 disposed at a position projected in the longitudinal direction beyond the battery cell arrayed body 103U of the upper layer out of the battery cell arrayed body 103L of the lower layer.

After the respective conductive members 191 are attached, the voltage detection substrates 201 are respectively attached along the vertical wall surface sections 114, 114 on both sides of the holding case 111 so as to be overlaid on top of these conductive members 191. In the present embodiment, the voltage detection substrates 201 are screw-fastened to the holding case 111.

The voltage detection substrate 201 includes a voltage detection circuit that detects the voltage of the each battery cell 101. The voltage detection substrate 201 has a belt sheet shape extending with a constant width for example, and a connector 202 for connecting the voltage detection line 55 is arranged in one end of the voltage detection substrate 201.

In the voltage detection substrate 201, opening sections 203 are respectively formed at locations opposing generally center part of the respective conductive members 191 in a state attached to the vertical wall surface section 114. In the each opening section 203, a voltage detection terminal 204 electrically connected to the connection terminal 192 of the conductive member 191 is projectingly arranged.

The voltage detection terminals 204 are configured to be respectively disposed at positions opposing the generally center position of the respective conductive members 191 so as to connect to the respective conductive members 191 even when the voltage detection substrate 201 is reversed in the longitudinal direction and is attached in a state one side and the other side in the longitudinal direction are substituted to each other.

Also, a first connection terminal 205 capable of electrically connecting to either one of the positive electrode terminal 40A or the negative electrode terminal 40B is arranged in one end of the voltage detection substrate 201, and a second connection terminal 206 connected to the other one of the positive electrode terminal 40A or the negative electrode terminal 40B is arranged in the other end of the voltage detection substrate 201.

The positions of the first connection terminal 205 and the second connection terminal 206 are set so as to respectively connect to the positive electrode terminal 40A and the negative electrode terminal 40B even when the voltage detection substrate 201 is attached so as to be reversed in the longitudinal direction.

For example, when the cell block 40 is used as the first cell block 41, the negative electrode terminal 40B side becomes the case front end surface section 62 and is disposed on the communication member 71 side (refer to FIG. 3). Therefore, as shown in FIG. 14, the voltage detection substrate 201 is attached so that the connector 202 is disposed on the negative electrode terminal 40B side that becomes the communication member 71 side. Further, in the other vertical wall surface section 114 also that is not shown in FIG. 14, the voltage detection substrate 201 is attached so that the connector 202 is disposed on the negative electrode terminal 40B side.

When the voltage detection substrate 201 is attached so that the connector 202 is disposed on the negative electrode terminal 40B side thus, the first connection terminal 205 is disposed and connected at a position opposing a connection section 193 that connects the negative electrode terminal 40B and the battery cell 101 of the lower layer to each other. Also, the second connection terminal 206 is disposed at and connected to a position opposing an extension section 194 extended downward from the positive electrode terminal 40A, connected to the battery cell 101 of the upper layer and further extended downward.

On the other hand, when the cell block 40 is used as the second cell block, the positive electrode terminal 40A side becomes the case front end surface section 62 and is disposed on the communication member 71 side. Therefore, as shown in FIG. 15, the voltage detection substrate 201 is attached so that the connector 202 is disposed on the positive electrode terminal 40A side that becomes the holder side.

When the voltage detection substrate 201 is attached so that the connector 202 is disposed on the positive electrode terminal 40A side, the first connection terminal 205 is disposed at and connected to a position opposing the extension section 194 of the positive electrode terminal 40A. Also, the second connection terminal 206 is disposed at and connected to a position opposing the connection section 193 of the negative electrode terminal 40B.

According to the configuration, the voltage detection substrate 201 has attaching compatibility in the front/back direction, it is not necessary to use an exclusive product, the kind of components can be reduced, and the production cost can be reduced.

Also, in short, the configuration of the third cell block 43 is different from the first cell block 41 and the second cell block 42 in terms that the number of pieces of the battery cell is 12 in the third cell block 43 and the length in the longitudinal direction of the holding case is configured to be shorter than that of the first cell block 41 and the second cell block 42.

Further, although it is not particularly illustrated, in the case front end surface section that becomes the negative electrode terminal 40B side, an extension communication member that extends the coolant introduction port forward is formed integrally, and it is configured that, by being furnished in the module case 2, the front end of the extension communication member abuts upon the case front wall section 21 to communicate with the suction port 22, and the case back end surface section abuts upon the case back wall section 31 to communicate with the exhaust port 32.

<Shutter Structure>

Next, a structure of the upper cap section 12 in the present embodiment will be described in detail using FIG. 16 and FIG. 17.

Figure 17:
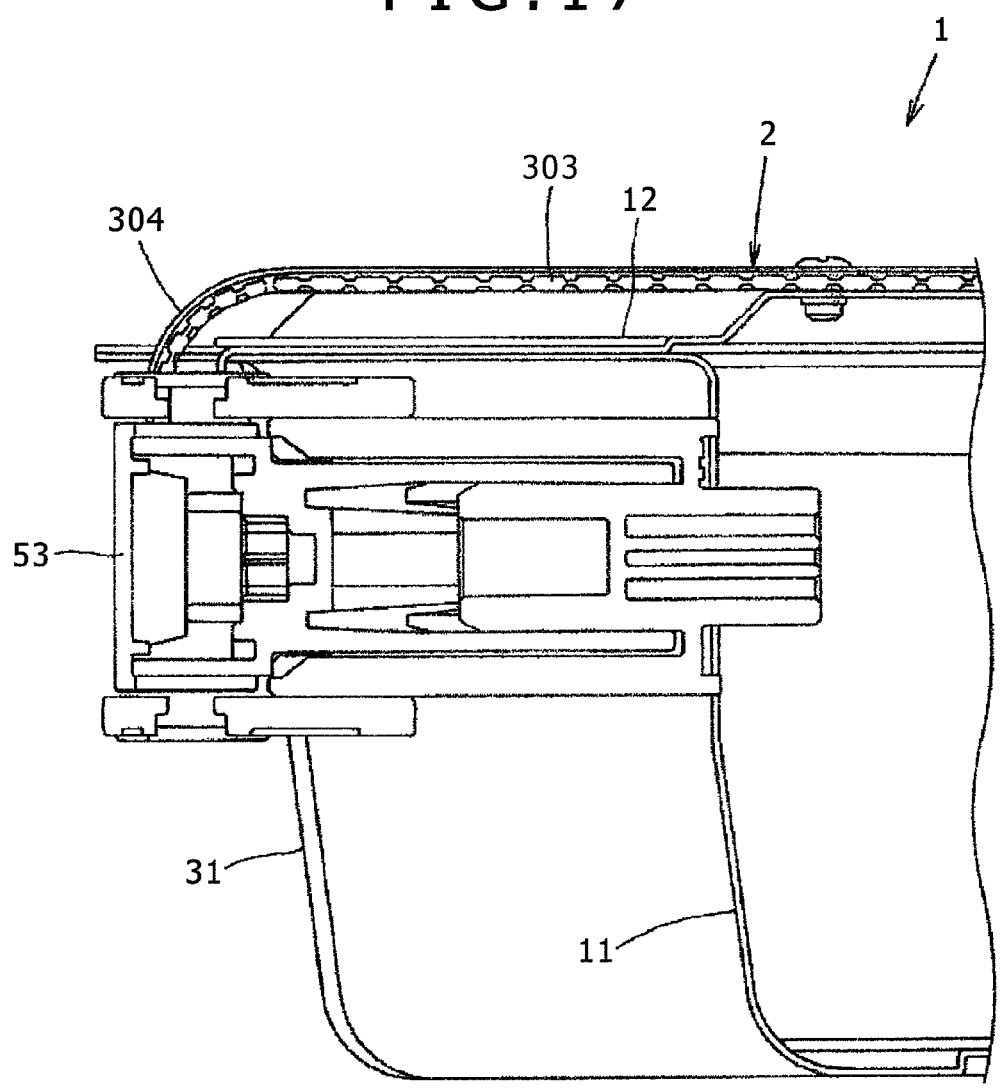
FIG. 17 is a cross-sectional view explaining the structure of the shutter.

FIG. 16 is a perspective view explaining a structure of a shutter arranged in the upper cap section, and FIG. 17 is a drawing when the cross section taken along the line XVII to XVII of FIG. 16 (a) is viewed along an arrow. FIG. 16 (a) shows the closed state of the shutter, and FIG. 16 (b) shows the opened state of the shutter.

In the upper cap section 12 of the module case 2, an upper cap opening 12a communicating with the inside of the module case 2 is formed, and a slide type shutter 301 that opens/closes the upper cap opening 12a is arranged.

The shutter 301 includes a flat sheet section 302 supported so as to be reciprocatingly movable to the opening direction and the closing direction along the upper surface of the upper cap section 12, and a slat section 303 extended so as to continue to the end on the opening direction side of the flat sheet section 302.

The flat sheet section 302 is supported so as to be selectively disposed at the opened position for opening the upper cap opening 12a and the closed position for closing the upper cap opening 12a, and, when it is disposed at the opened position shown in FIG. 16 (b), opens the upper cap opening 12a to expose the inverter connection terminal 311 in the case 2. Also, the flat sheet section 302 is configured to close the upper cap opening 12a and to cover and hide the inverter connection terminal 311 when the flat sheet section 302 is disposed at the closed position shown in FIG. 16 (a).

Also, in the flat sheet section 302, a window hole 302a is arranged and configured to be capable of covering and hiding a safety bolt 312 at a position other than the opened position and to be capable of exposing the safety bolt 312 at the opened position. The safety bolt 312 constitutes one of plural bolts 5 that fasten the upper cap section 12 and the lower cap section 11 with each other, and prevents the upper cap section 12 from being detached unless fastening is released.

The slat section 303 is guided by a rail section 304 so as to change the moving direction thereof downward at the back end edge of the upper cap section 12 when the slat section 303 is moved to the opening direction.

As shown in FIG. 17, in the shutter 301, a connector 53a of the SD switch 53 is detachably attached at a position opposing the open side in the moving direction of the slat section 303 in a state the flat sheet section 302 is disposed at the closed position, and the flat sheet section 302 cannot be moved from the closed position toward the opening direction unless the connector 53a is detached. The SD switch 53 has a configuration of disconnecting electric connection of the second cell block 42 and the third cell block 43 by detaching the connector 53a.

According to the shutter structure having the configuration described above, in a state the connector 53a of the SD switch 53 is attached, the shutter 301 is held at the closed position, and the shutter 301 cannot be moved toward the opening direction. Therefore, the inverter connection terminal 311 and the safety bolt 312 can be prevented from being exposed to the outside in a state electric connection between the second cell block 42 and the third cell block 43 is maintained.

Therefore, a worker and the like can be prevented from erroneously touching the inverter connection terminal 311 in a connected state, and the upper cap section 12 can be prevented from being detached from the lower cap section 11 by releasing of fastening of the safety bolt 312. Accordingly, it is possible that work such as maintenance and the like is executed in a state power supply is definitely interrupted, and safety of a worker can be secured.

<Module Case>

Next, a configuration of the module case 2 in the present embodiment will be described in detail using FIG. 18 and FIG. 19.

Figure 18:
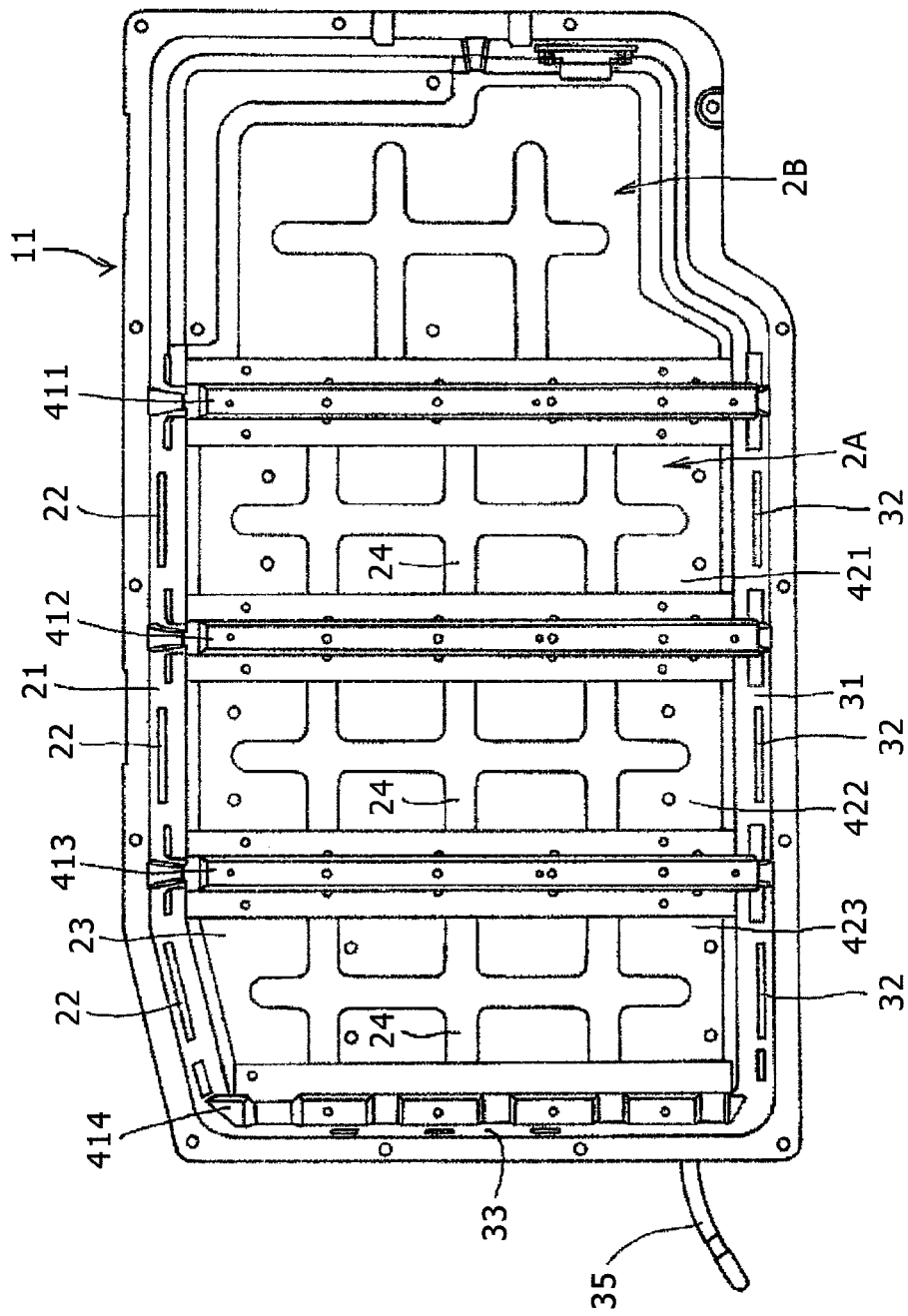
FIG. 18 is a plan view explaining a structure of a lower cap section.
Figure 19:
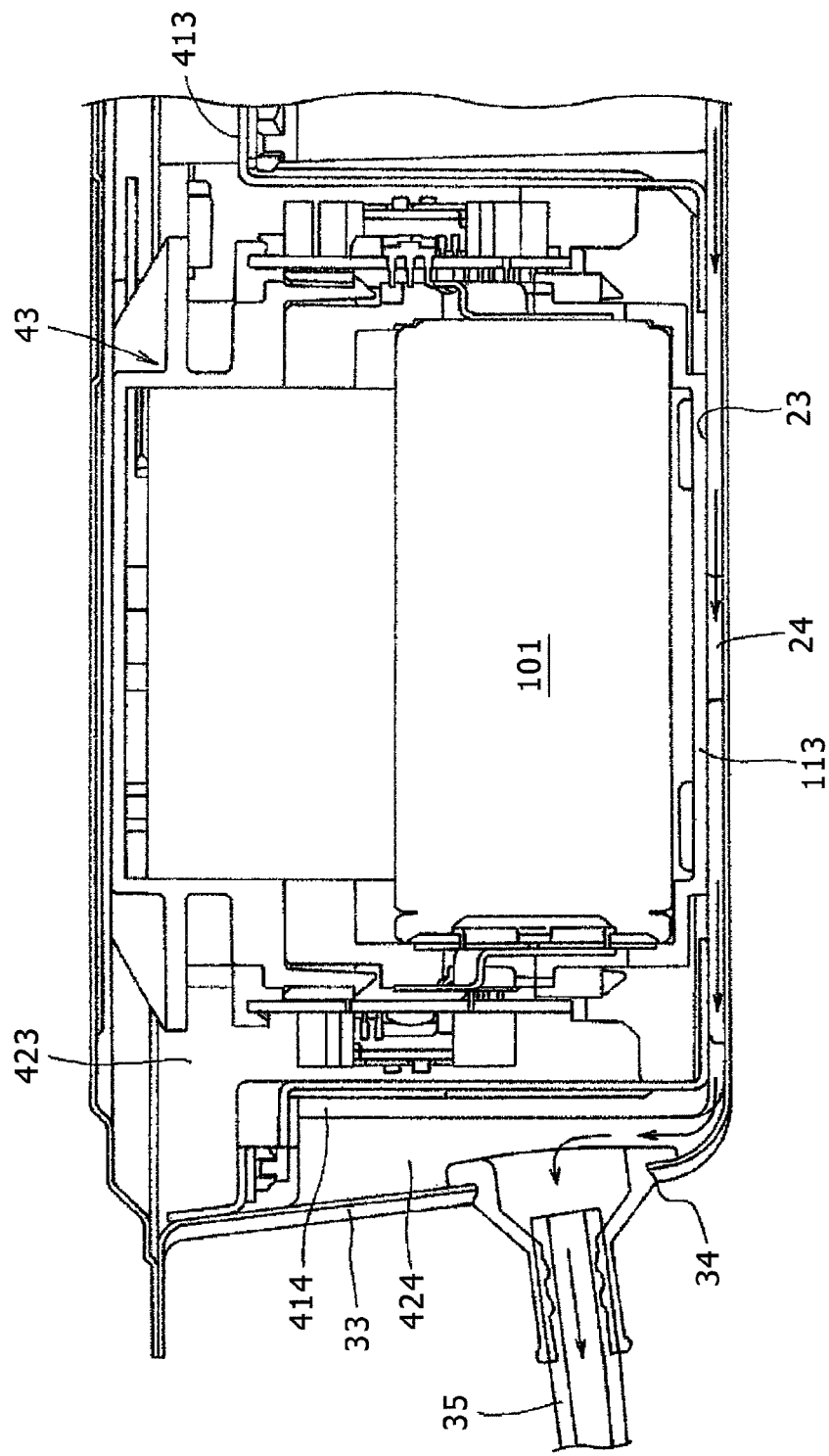
FIG. 19 is a cross-sectional view explaining a structure for discharging gas in a storage chamber.

FIG. 18 is a plan view of the lower cap section of the module case, and FIG. 19 is a drawing showing an essential part of a secondary battery module by a cross-section.

In the lower cap section 11, four ribs 411 to 414 extending in the front/back direction at a predetermined interval in the lateral direction are arranged. The respective ribs 411 to 414 are erected on a case bottom wall section 23 that spreads in a flat plane shape over between the case front wall section 21 and the case back wall section 31 of the lower cap section 11. Out of these four ribs 411 to 414, the first rib 411 partitions the inside of the lower cap section 11 into one side in the lateral direction and the other side in the lateral direction, and forms the battery unit storage area 2A that stores the battery unit 3 and the control unit storage area 2B that stores the control unit 4 (middle wall rib).

The second rib 412 and the third rib 413 divide the battery unit storage area 2A into three cell block storage chambers, form a first storage chamber 421 capable of storing the first cell block 41 between the first rib 411 and the second rib 412, and form a second storage chamber 422 capable of storing the second cell block 42 between the second rib 412 and the third rib 413 (middle wall ribs).

The fourth rib 414 is arranged along a case side wall section 33, and forms a third storage chamber 423 capable of storing the third cell block 43 between the third rib 413 (side wall rib).

In the upper part of the respective ribs 411 to 414, screw holes for fixing a cell block bracket 91 (refer to FIG. 2) are arranged. The cell block bracket 91 is apiece for holding down the cell blocks 41 to 43 stored in the respective storage chambers 421 to 423 from above respectively and restricting movement in the vertical direction for fixing, and is fastened to the upper part of the respective ribs 411 to 414 by screws.

As shown in FIG. 19, a gas exhaust chamber 424 having a predetermined interior space is formed between the fourth rib 414 and the case side wall section 33. In the case side wall section 33, a gas exhaust port 34 is openingly formed to which a gas exhaust pipe 35 is connected.

Also, as shown in FIG. 18, the suction ports 22 of the case front wall section 21 and the exhaust ports 32 of the case back wall section 31 are formed so as to form pairs respectively at positions corresponding to the respective storage chambers 421 to 423. The respective cell blocks 41 to 43 are stored in a state movement in the lateral direction is restricted by the ribs 411 to 414.

As shown in FIG. 19, in the case bottom wall section 23 of the lower cap section 11, plural shallow groove sections 24 are arranged. The respective shallow groove sections 24 are formed for example by protruding the lower cap section 11 downward from the case bottom wall section 23 in press-molding. The respective shallow groove sections 24 are arranged so as to extend in the front/back direction and in the lateral direction so as to cross each other. The shallow groove sections 24 extending in the lateral direction continues over between the first storage chamber 421 and the third storage chamber 423, and the ends thereof communicate with the gas exhaust chamber 424 formed between the fourth rib 414 and the case side wall section 33.

When gas is emitted from at least one battery cell 101 of the respective cell blocks 41 to 43 stored in the respective storage chambers 421 to 423, the shallow groove sections 24 can make the gas pass through as the flow direction thereof is shown by an arrow in FIG. 19 and flow in to the gas exhaust chamber 424. The gas having flown in to the gas exhaust chamber 424 is discharged to the outside of the module case 2 through the gas exhaust pipe 35.

According to the configuration described above, because the shallow groove sections 24 are formed so as to continue over between the first storage chamber 421 and the third storage chamber 423 and the ends of the shallow groove sections 24 communicate with the gas exhaust chamber 424, when gas is emitted from at least one battery cell 101 of the respective cell blocks 41 to 43 stored in the storage chambers 421 to 423, the gas can be made to circulate as far as the gas exhaust chamber 424 passing through the shallow groove sections 24 and can be discharged to the outside of the module case 2 from the gas exhaust chamber 424. Therefore, the gas emitted inside the module case 2 can be prevented from staying in the module case 2, encroaching into the holding case 61 of the cell block 40 through the gap between the case front wall section 21 and the case front end surface section 62 for example or passing through the gap between the case back wall section 31 and the case back end surface section 64, and being discharged through the exhaust port 32 of the case back wall section 31.

Also, because the shallow groove sections 24 extending in the front/back direction and the lateral direction are formed in the case bottom wall section 23 and the first rib 411 to the fourth rib 414 are arranged so as to extend in the front/back direction, high stiffness of the lower cap section 11 can be obtained, and the module case 2 can be prevented from being deformed.

Further, the present invention is not limited to the embodiment described above, and a variety of alterations can be effected within a range not departing from the purpose of the present invention. For example, although description was made in the embodiment described above with an example of a case in which the communication member 71 was interposed between the case front wall section 21 and the case front end surface section 62 to form the space regions 80A, 80B, it may also be configured that the communication member is interposed between the case back wall section 31 of the module case 2 and the case back end surface section 64 of the cell block 40 to form the space region. Further, in the embodiment described above, description was made with an example of a case the cell block 40 was of two layers of the battery cell arrayed body 103U of the upper layer and the battery cell arrayed body 103L of the lower layer, however it may be of three layers or more.

Second Embodiment

Next, the second embodiment of the present invention will be described in detail referring to drawings. Also, with respect to the constituting elements similar to those of the first embodiment, same reference signs will be used and the detailed description thereof will be omitted.

The main characterized configuration in the present embodiment is a configuration that a case front wall section 521 of a lower cap section 511 and the case front end surface section 62 of the cell block 40 as well as a case back wall section 531 of the lower cap section 511 and the case back end surface section 64 of the cell block 40 are made depart from each other by a predetermined distance, a suction duct 6 and the coolant introduction port 62a of the cell block 40 are communicated each other by a suction duct communication member 601, and an exhaust duct 7 and the coolant lead out port 64a of the cell block 40 are communicated each other by an exhaust duct communication member 701. Thus, a forward space region 541 can be formed between the case front wall section 521 of the lower cap section 511 and the case front end surface section 62 of the cell block 40 and above the suction duct communication member 601, a backward space region 542 can be formed between the case back wall section 531 of the lower cap section 511 and the case back end surface section 64 of the cell block 40 and above the exhaust duct communication member 701, and the wirings 54 to 56 between respective cell blocks 30 and the control unit 4 can be gathered together in these forward space region 541 and backward space region 542.

Figure 20:
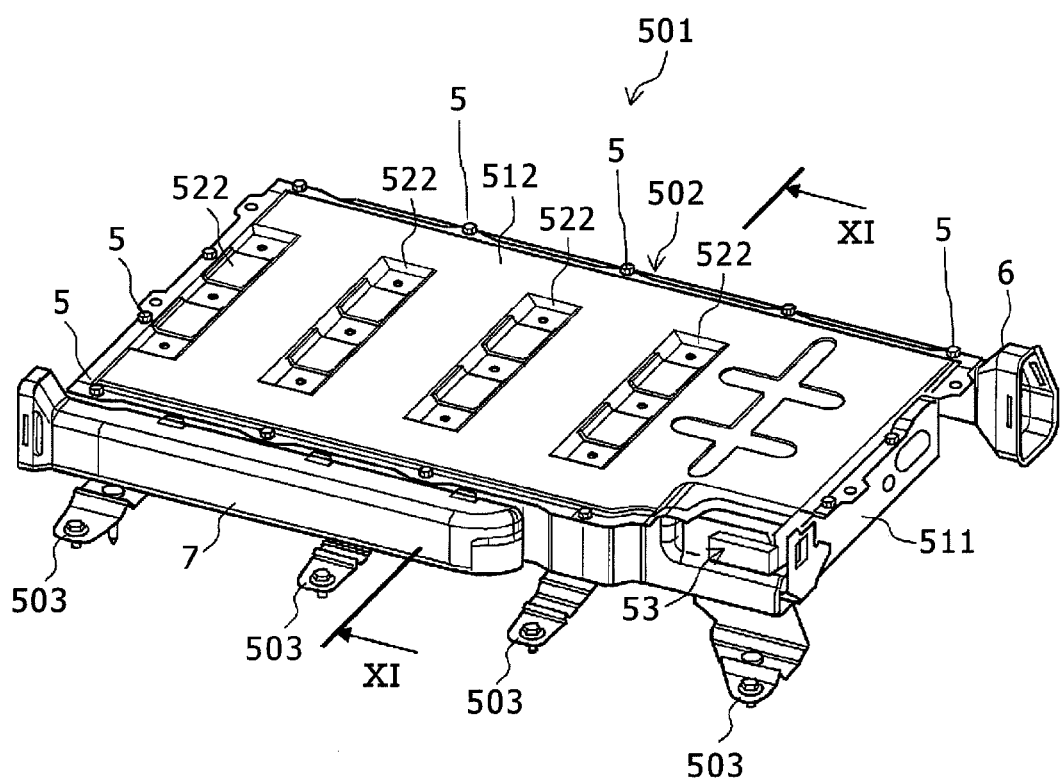
FIG. 20 is a perspective view showing an external appearance configuration of a lithium ion battery device in relation with the second embodiment.
Figure 22:
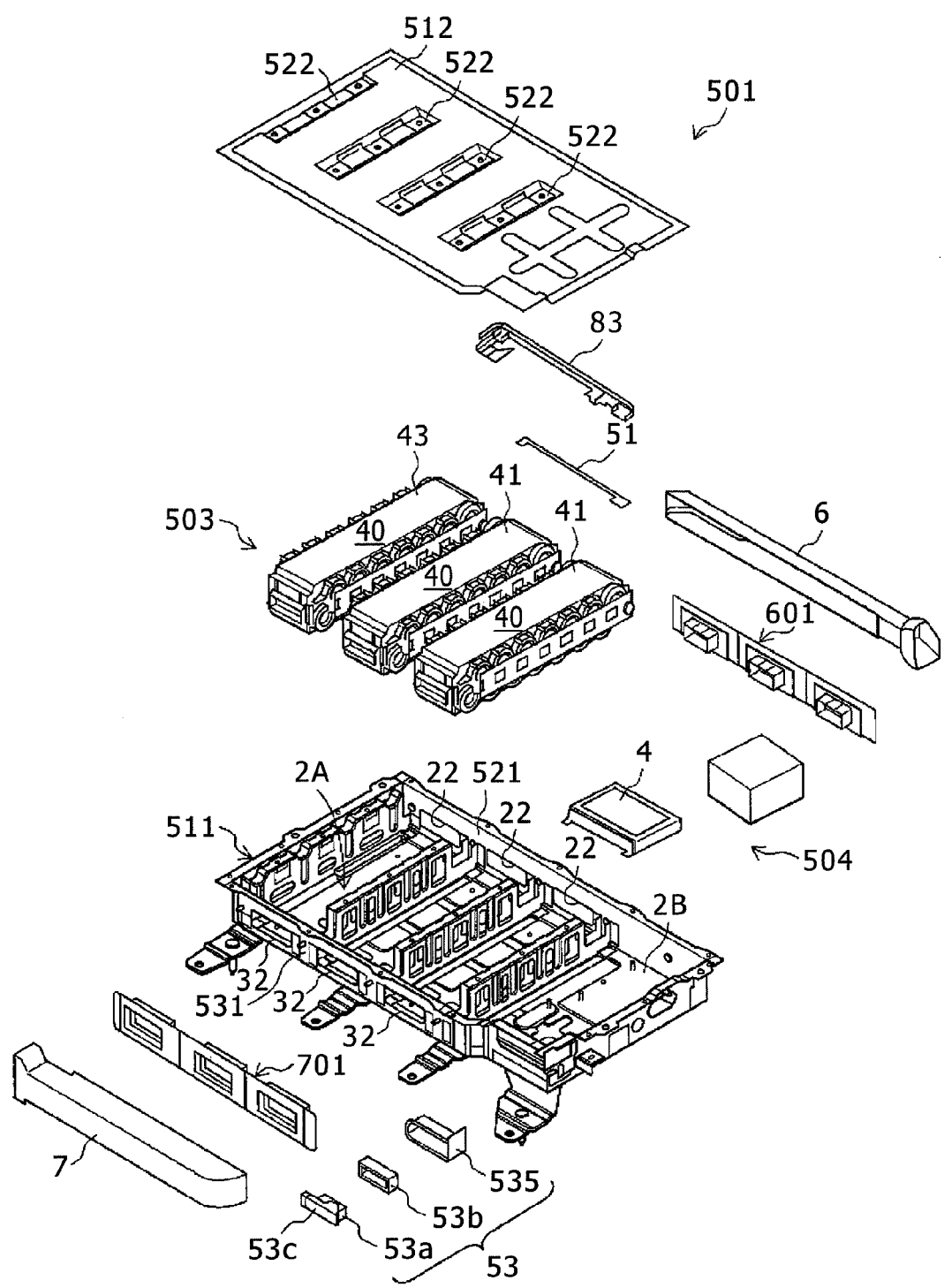
FIG. 22 is an exploded perspective view of the lithium ion battery device.
Figure 23:
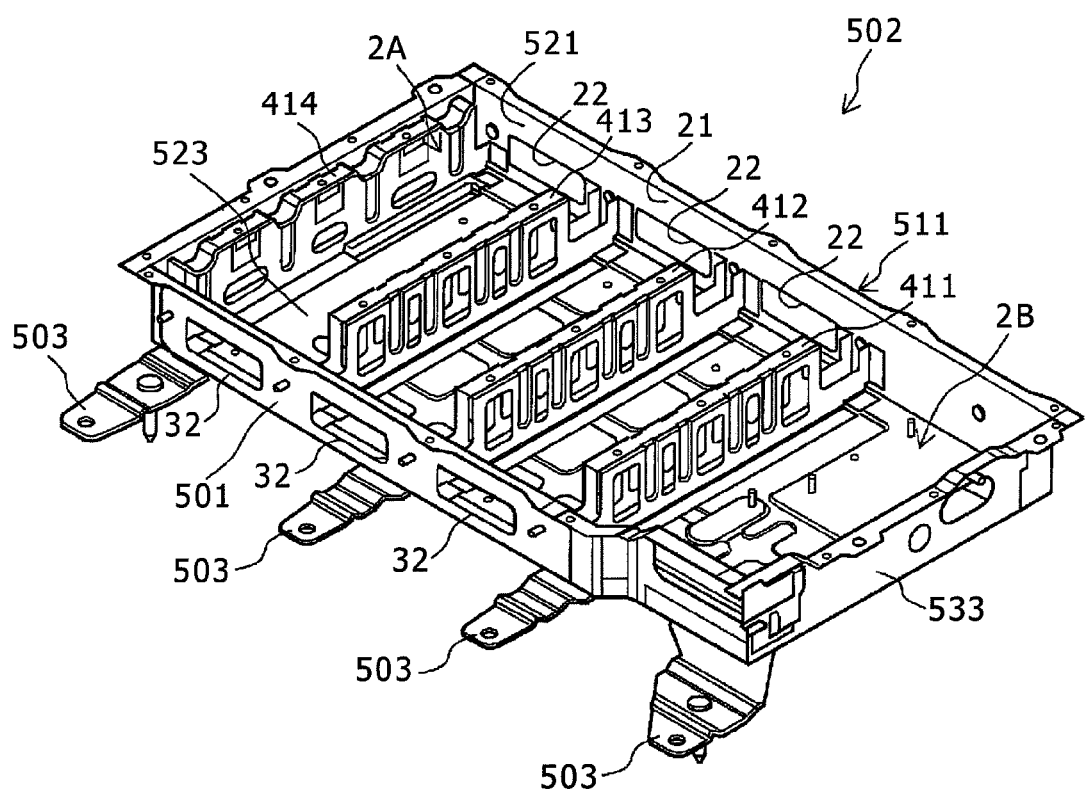
FIG. 23 is a perspective view explaining a structure of a lower cap section.

As shown in FIG. 20, a lithium ion battery device 501 includes a module case 502 of a laterally-long rectangular box shape that spreads is a flat plane shape. The suction duct 6 is connected to the front part of the module case 502, and the exhaust duct 7 is connected to the back part. The suction duct 6 is connected to an air conditioner of a vehicle not illustrated, and is configured to be capable of receiving supply of cooling air. The exhaust duct 7 communicates with and is connected to the inside of a cabin of a vehicle not illustrated, and is configured to be capable of discharging the air having been introduced through the suction duct 6 and having passed through the inside of the module case 502 to the vehicle interior or the vehicle exterior.

The module case 502 is composed of the lower cap section 511 and an upper cap section 512. The lower cap section 511 has a shallow dish shape, and the upper cap section 512 has a flat sheet shape blocking the upper part of the lower cap section 511. The lower cap section 511 and the upper cap section 512 are formed by pressing work and the like of a thin sheet made of metal.

The lower cap section 511 is formed by box-bending work, and includes a case bottom wall section 523 of a generally rectangular shape in plan view, the case front wall section 521 and the case back wall section 531 bent at four sides of the case bottom wall section 523, erected perpendicularly and opposing each other in the front and back, and a pair of case side wall sections 533 opposing each other in the right and left. Also, the case front wall section 521, the case back wall section 531 and the case side wall sections 533 are joined each other airtightly by welding work.

Because the lower cap section 511 has such a shape that the case front wall section 521, the case back wall section 531 and the case side wall sections 533 are erected perpendicularly with respect to the case bottom wall section 523 by box-bending work, compared with deep drawing work of the lower cap section 11 in the first embodiment, there is no useless space, limited space inside the vehicle can be effectively utilized, and, in being installed in a same installation space, larger inner space in the case can be secured. Also, in the four ribs 411 to 414 arranged in the lower cap section 511, plural hole sections are arranged, and lightening work aiming weight reduction is executed. Further, plural brackets 503 for fixing the battery module to the floor of the vehicle are arranged in the lower part of the lower cap section 511.

In the upper cap section 512, instead of the cell block bracket 91 in the first embodiment, a cell block hold-down section 522 that holds down and fixes the respective cell blocks 40 to the lower cap section 511 is arranged. The cell block hold-down section 522 is formed by bulging a part of the upper cap section 512 downward by press-molding. The cell block hold-down section 522 is configured to be fastened to the upper part of the respective ribs 411 to 414 by screws so as to oppose the respective ribs 411 to 414 when the upper cap section 512 is attached to the lower cap section 511. Therefore, the cell block bracket 91 in the first embodiment can be omitted and the weight can be reduced. Also, the degree of freedom of designing can be improved such that the height position of the upper cap section 512 is lowered by the portion of the cell block bracket 91 and the module case 502 is made thin, the total length of the module 40 is shortened by increasing the height of the module 40 without changing the height position of the upper cap section 512 for example and the departing distance of the case front wall section and the case back wall section with respect to the cell block 40 can be increased, and so on. Further, it is possible to reduce the components cost by reduction of the number of pieces of the components and to reduce the production cost by reduction of the assembling man-hours.

In the battery unit storage area 2A in the module case 502, the three cell blocks 40 of the first cell block 41, the second cell block 42 and the third cell block 43 are stored. Although the respective cell blocks 41 to 43 have a same configuration each other, in the third cell block 43 only, the number of pieces of the battery cell 101 is less by 2 pieces, and dummy cells are stored in the space of two pieces portion. Therefore, the respective cell blocks 41 to 43 can be commonalized, and manufacturing and assembling can be facilitated.

Figure 24:
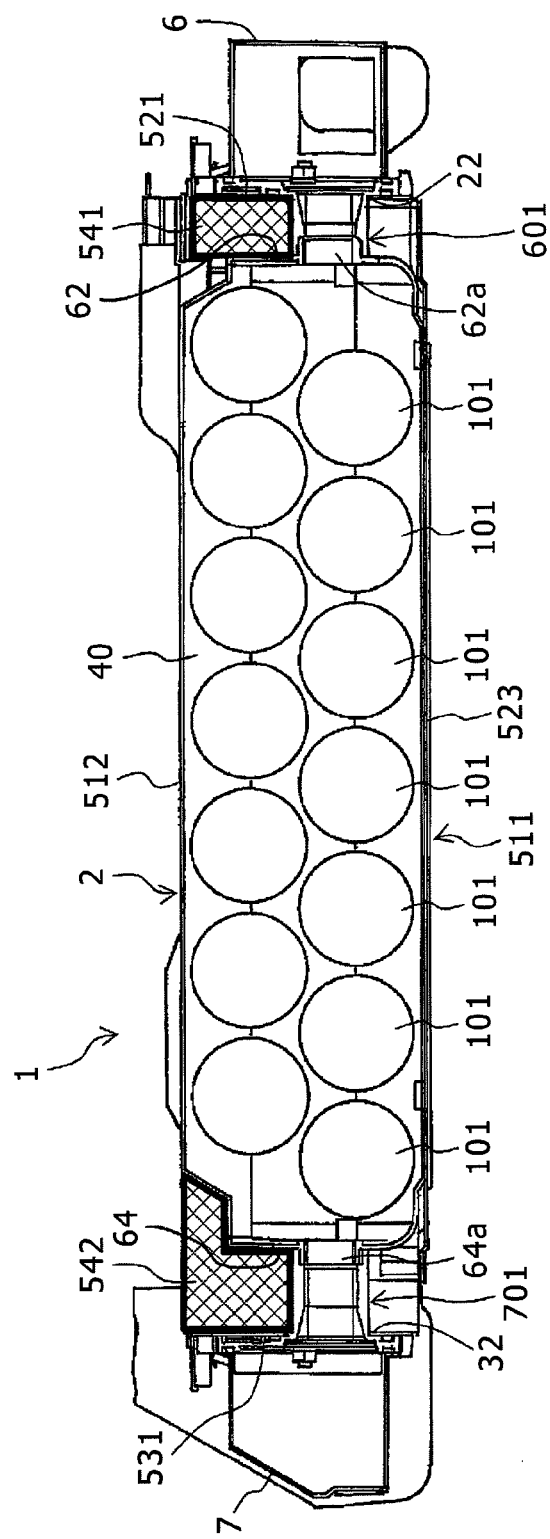
FIG. 24 is a cross-sectional view taken from line XI to XI of FIG. 20.

As shown in FIG. 24, the cell block 40 is disposed at an intermediate position in the front/back direction of the lower cap section 511, and the case front end surface section 62 of the cell block 40 and the case front wall section 521 of the lower cap section 511 as well as the case back end surface section 64 of the cell block 40 and the case back wall section 531 of the lower cap section 511 depart from each other by a predetermined distance.

To the case front wall section 521 of the lower cap section 511, the suction duct communication member 601 that communicates the suction duct 6 and the coolant introduction port 62a of the cell block 40 with each other is attached. Also, to the case back wall section 531 of the lower cap section 511, the exhaust duct communication member 701 that communicates the coolant lead out port 64a of the cell block 40 and the exhaust duct 7 with each other is attached.

The suction duct communication member 601 has a configuration of being inserted into the suction port 22, extending over between the case front end surface section 62 of the cell block 40 and the case front wall section 521 of the lower cap section 511, and making the cooling air flow in and introducing the same from the suction duct 6 into the cell block 40. The exhaust duct communication member 701 has a configuration of being inserted into the exhaust port 32, extending over between the case back end surface section 64 of the cell block 40 and the case back wall section 531 of the lower cap section 511, and making the air in the cell block 40 flow out to the exhaust duct 7 to lead out the same.

Figure 26:
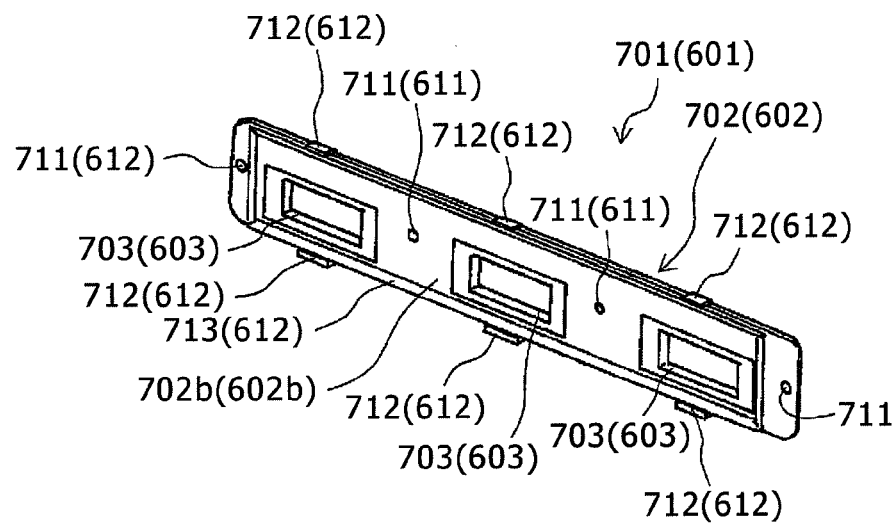
FIG. 26 is a perspective view showing a discharge duct communication member from the front surface side.
Figure 27:
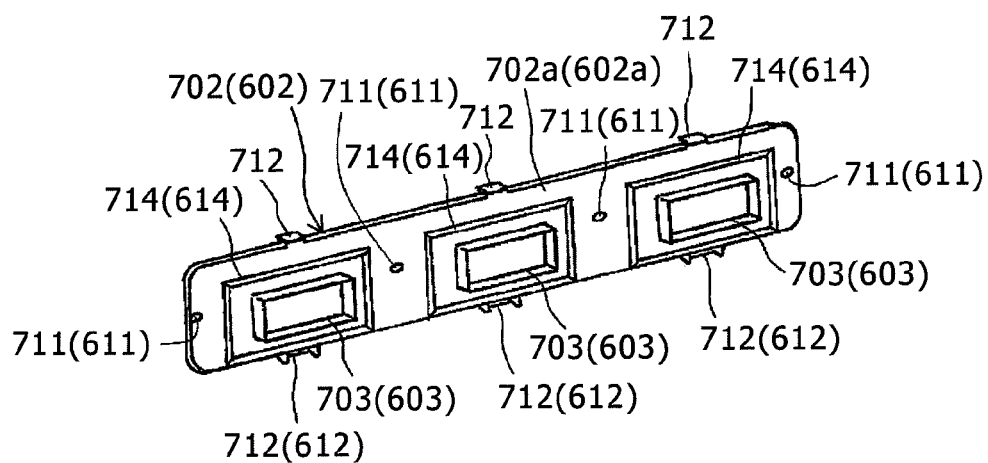
FIG. 27 is a perspective view showing the discharge duct communication member from the back surface side.

A configuration of the exhaust duct communication member 701 will be described in detail below using FIG. 25 to FIG. 27. Also, because the suction duct communication member 601 has a configuration generally same to that of the exhaust duct communication member 701, detailed description thereof will be omitted by attaching reference signs of the corresponding configuration in FIG. 26 and FIG. 27.

The exhaust duct communication member 701 includes a fixing section 702 of a flat sheet shape fixed to the back surface of the case back wall section 531, and nozzle sections 703 projecting in a tubular shape from the fixing section 702 and inserted into the exhaust ports 32. Opening holes are arranged at positions corresponding to the exhaust ports 32 of the fixing section 702, and the center holes of nozzle sections 703 are arranged so as to continue to the opening holes. The fixing section 702 is provided with plural bolt holes 711, and is fixed to the case back wall section 531 by inserting fixing bolts 721 projectingly arranged on the back surface of the case back wall section 531 and screwing nuts 722 to such the bolt holes 711. Also, on an exhaust duct connection surface 702b of the fixing section 702, plural locking claws 712 are arranged and are configured to be capable of attaching the exhaust duct 7.

On a surface 702a opposing the case back wall section 531 of the fixing section 702, a seal material 714 is arranged and seals the gap between the case back wall section 531 of the lower cap section 511. Further, a seal member 713 is arranged on the exhaust duct connection surface 702b of the fixing section 702 also, and seals the gap between the exhaust duct 7.

The coolant lead out port 64a of the cell block 40 has a tubular shape with a rectangular cross section, and the nozzle section 703 is externally fit and connected to the outside of the coolant lead out port 64a. Therefore, the exhaust duct communication member 701 constitutes a passage that connects the inner space of the cell block 40 and the inner space of the exhaust duct 7 to each other, and can discharge the air after cooling from the cell block 40 to the exhaust duct 7.

Figure 25:
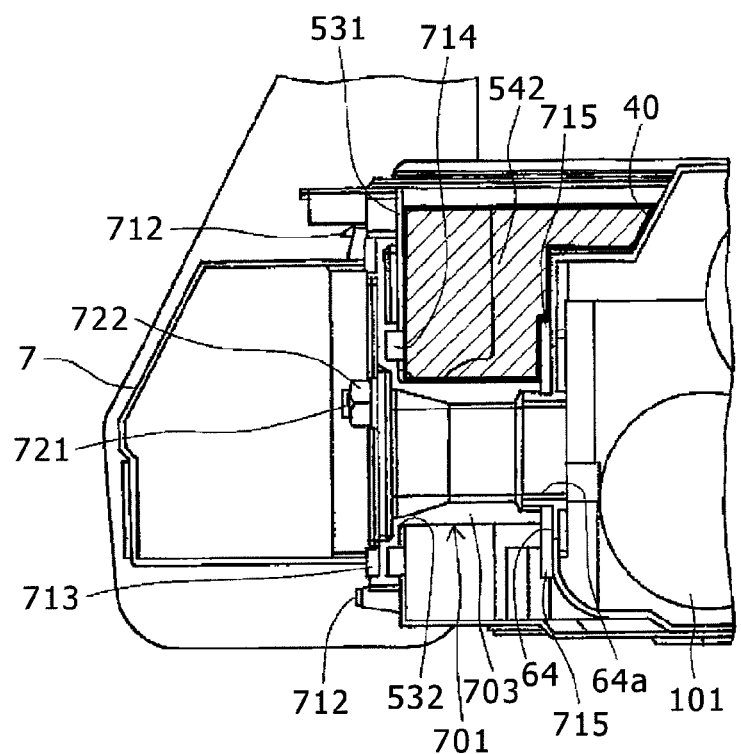
FIG. 25 is a partial enlarged view of FIG. 24.

As shown in FIG. 25, the nozzle section 703 is sealed by a seal material 715 that is interposed in a gap between the case back end surface section 64 of the cell block 40. Also, in the present embodiment, the nozzle sections 703 are arranged by three pieces corresponding to the three exhaust ports 32 that open to the case back wall section 531 of the lower cap section 511.

The suction duct communication member 601 and the exhaust duct communication member 701 having the configuration described above are attached after the cell block 40 is disposed inside the lower cap section 511. The suction duct communication member 601 is brought closer from the front of the lower cap section 511 and is fixed to the case front wall section 521, and the exhaust duct communication member 701 is brought closer from the back of the lower cap section 511 and is fixed to the case back wall section 531. Also, the suction duct 6 is attached to the suction duct communication member 601, and the exhaust duct 7 is attached to the exhaust duct communication member 701.

Because the suction duct communication member 601 and the exhaust duct communication member 701 are attached to the lower cap section 511 so as to be tucked from both sides in the longitudinal direction of the cell block 40 after the cell block 40 is disposed inside the lower cap section 511, the suction duct communication member 601 and the coolant introduction port 62a as well as the exhaust duct communication member 701 and the coolant lead out port 64a can be simply and securely communicated with each other, and high airtight property can be obtained.

Also, because the suction duct communication member 601 and the suction duct 6 as well as the exhaust duct communication member 701 and the exhaust duct 7 are fixed to each other by the locking claws 712, workability is excellent, and assembly work of a total lithium ion battery device 501 can be simplified. Further, because the locking claws 712 are not required to arrange a through hole compared to riveting and the like, high airtight property can be easily obtained.

When attachment of the suction duct communication member 601 and the exhaust duct communication member 701 finishes, then, work for connecting the respective cell blocks 41 to 43 and the control unit 4 to each other by wiring is executed. The forward space region 541 is formed between the case front wall section 521 of the lower cap section 511 and the case front end surface section 62 of the cell blocks 41 to 43 and outside and above the suction duct communication member 601, and the backward space region 542 is formed between the case back wall section 531 of the lower cap section 511 and the case back end surface section 64 of the cell blocks 41 to 43 and outside and above the exhaust duct communication member 701. Wiring connecting the respective cell blocks 41 to 43 and the control unit 4 to each other is gathered together utilizing the forward space region 541 and the backward space region 542 as wiring passages.

Therefore, compared to prior arts of executing wiring above a cell block, the dimension in the height direction of the total lithium ion battery device 501 can be reduced, and the space can be saved. Thus, application to the vehicle interior where restriction in the height direction is larger than that in the lateral direction for example becomes possible, and wider vehicle interior space can be secured.

Also, because the forward space region 541 and the backward space region 542 are formed above the suction duct communication member 601 and the exhaust duct communication member 701, wiring work can be executed while visually confirming the wiring state from above the lower cap section 511. Therefore, the voltage detection lines 55 of the respective cell blocks 41 to 43 are not hidden below the communication member as done in the first embodiment. Accordingly, workability is excellent, wiring can be executed simply and securely, and assembling work of the total lithium ion battery device 501 can be simplified.

<Upper Cap Section Fixing Structure>

Next, a fixing structure for the upper cap section 512 in the present embodiment will be described using FIG. 28 to FIG. 30.

The upper cap section 512 is fixed to the lower cap section 511 by the plural bolts 5. Also, the upper cap section 512 has a special fixing structure so that the upper cap section 512 can be detached after safety has been secured.

Figure 28:
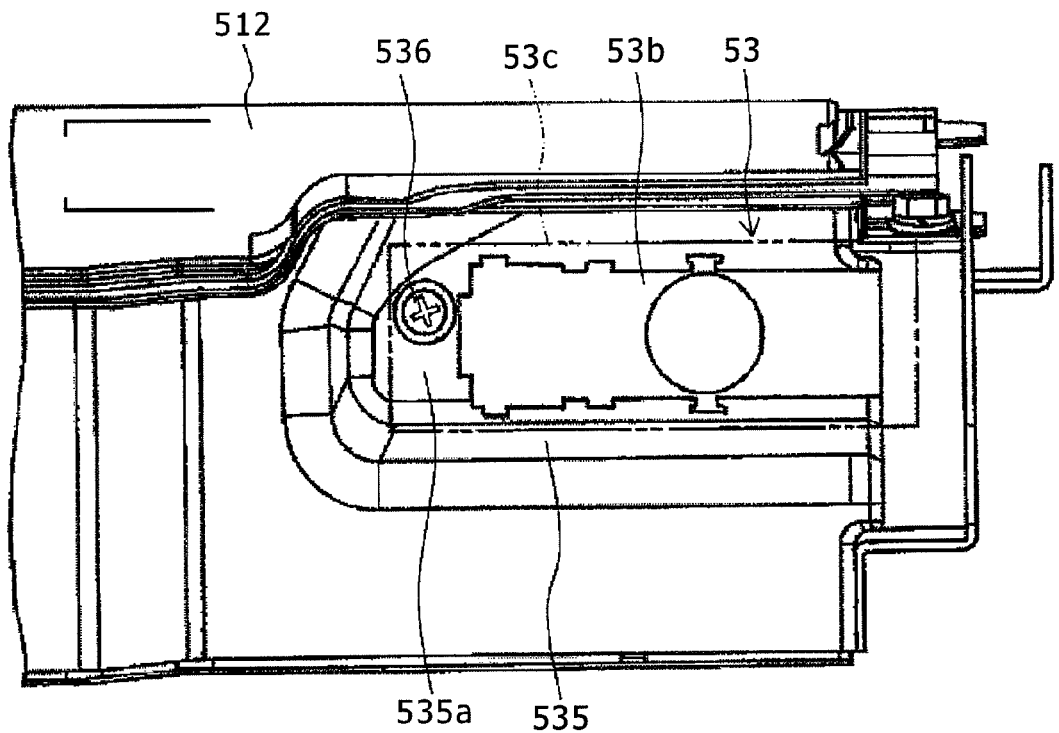
FIG. 28 is a drawing explaining an upper cap section fixing structure.
Figure 29:
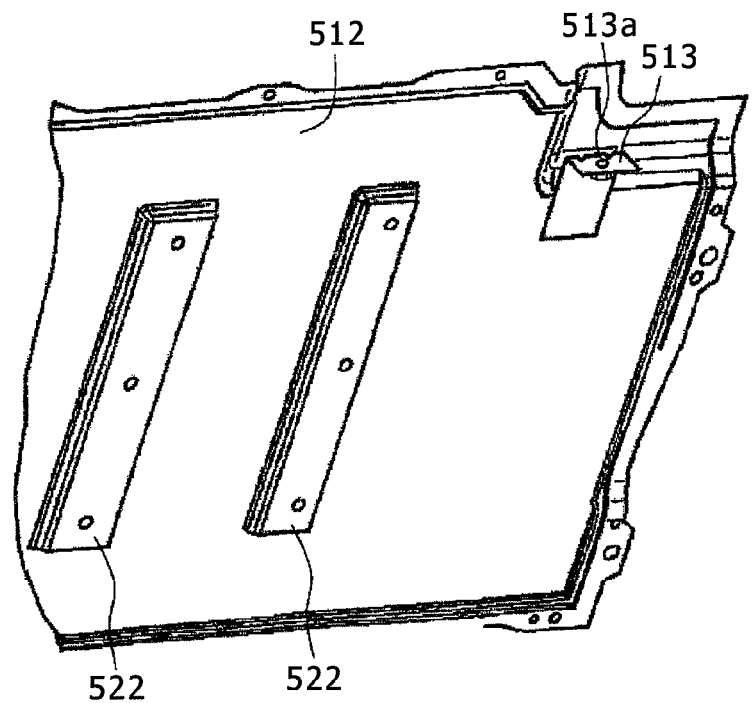
FIG. 29 is a drawing explaining an upper cap section fixing structure.

FIG. 28 is a front view of an SD switch attaching section, and FIG. 29 is a perspective view showing the back surface of the upper cap section.

The SD switch 53 is arranged on the control unit storage area 2B side of the back part of the module case 502. In the SD switch 53, a socket 53b is attached in an SD box 535 that opens to the case back wall section 531 of the lower cap section 511, and the connector 53a is detachably furnished.

The connector 53a is furnished by being inserted into the socket 53b from the back side of the module case 502. A lever 53c is arranged in the connector 53a, and it is configured that, by pulling to the near side and opening such the lever 53c, the cell block 40 can be electrically disconnected and can be detached from the socket 53b.

In a bottom section 535a of the SD box 535, as shown in FIG. 28, an opening hole capable of inserting a fixing bolt 536 thereinto is bored. Also, as shown in FIG. 29, on the lower surface of the upper cap section 512, a flange 513 is arranged which is disposed so as to oppose the bottom section 535a of the SD box 535 when the upper cap section 512 is properly disposed on top of the lower cap section 511. In the flange 513, a screw hole 513a is arranged at a position communicating with a bolt hole of the SD box 535, and it is configured that the upper cap section 512 can be fixed to the lower cap section 511 by screwing the distal end of the fixing bolt 536.

As shown in FIG. 28, the opening hole arranged in the bottom section 535a of the SD box 535 is arranged at a position which is a side position of the socket 53b of the SD switch 53 and where a tool cannot be inserted by being covered and hidden by the lever 53c in a state the lever 53c is closed and the tool can be inserted by opening the lever 53c and detaching the connector 53a from the socket 53b. Therefore, in order to detach the fixing bolt 536, it is necessary to surely open the lever 53c and to bring the connector 53a to a detached state, and the upper cap section 512 can be detached only in a state electric connection of the cell block 40 has been interrupted. Accordingly, it is configured that detachment work for the upper cap section 512 can be executed after safety has been secured.

Figure 30:
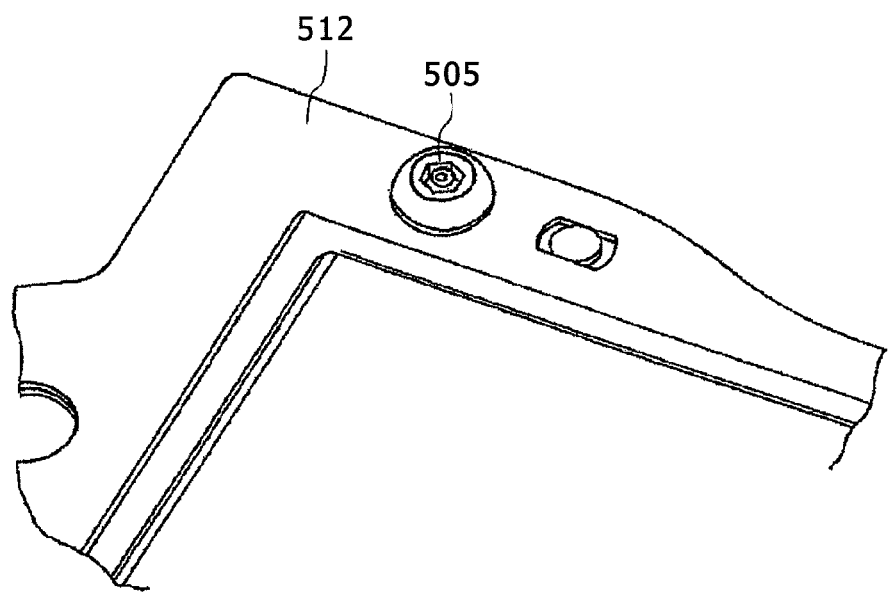
FIG. 30 is a drawing explaining an upper cap section fixing structure.

FIG. 30 is an enlarged view of a bolt that fixes the upper cap section. In the present embodiment, for at least one of the plural bolts 5 that fix the upper cap section 512, a special bolt 505 is used which has a head structure operable only by an exclusive special tool that is not generally circulated. Therefore, a person with a poor knowledge on the structure of the lithium ion battery device 501 and the like for example can be prevented from detaching the fixing bolt and opening the upper cap section 512.

COMPONENT LIST

1 . . . lithium ion battery device (secondary battery module), 2 . . . module case, 3 . . . battery unit, 4 . . . control unit, 11 . . . lower cap section, 12 . . . upper cap section, 21 . . . case front wall section, 22 . . . suction port (coolant circulation port), 31 . . . case back wall section, 32 . . . exhaust port (coolant circulation port), 40 . . . cell block, 61 . . . holding case, 62 . . . case front end surface section, 62a . . . coolant introduction port (coolant circulation port), 64 . . . case back end surface section, 64a . . . coolant lead out port (coolant circulation port), 71 . . . communication member

What is claimed is:

1. A secondary battery module, comprising:
    a module case that stores cell blocks, wherein each of the cell blocks includes a plurality of battery cells;
    cell wall coolant circulation ports that open to a case wall section of the module case;
    cell block coolant circulation ports that open to the cell blocks;
    a communication member enabling a gas tight seal communication between the cell wall coolant circulation ports and the cell block coolant circulation ports; and
    a space region formed outside the communication member and between the case wall section and the cell blocks, wherein one or more cell block voltage detection substrates are exposed to the space region between an end of the case wall section and the cell blocks.

2. The secondary battery module according to claim 1, wherein the module case comprises a case front wall section where suction ports open and a case back wall section where exhaust ports open,
    wherein each of the cell blocks comprises a case front end surface section that opposes the case front wall section and to which a coolant introduction port opens and a case back end surface section that opposes the case back wall section and to which a coolant lead out port opens, and
    wherein the communication member is interposed between the case front end surface section and the case front wall section, communicates the suction ports and the coolant introduction port with each other, and has a shape of forming the space region between the case front wall section and the case front end surface section and in the outside of the communication member.

3. The secondary battery module according to claim 2, wherein
    the communication member has a shape for positioning each cell block at a position where the case back end surface section of each cell block abuts the case back wall section and the coolant lead out port of the case back end surface section communicates with one of the exhaust ports of the case back wall section.

4. The secondary battery module according to claim 3, wherein the module case is provided with a plurality of suction ports and exhaust ports so as to form pairs at a predetermined interval in a lateral direction in the case front wall section and the case back wall section,
    wherein each of the cell blocks are disposed in parallel corresponding to the suction ports and the exhaust ports that form pairs, and
    wherein the communication member forms the space region that continues in the lateral direction over the cell blocks between the case front wall section and the case front end surface section and at least either below or above the communication member.

5. The secondary battery module according to claim 4, wherein
    the communication member forms a lower space region and an upper space region that continue in the lateral direction over the cell blocks and the communication member.

6. The secondary battery module according to claim 5, further comprising:
    a holder that extends continuously in the lateral direction over the cell blocks in the upper space region and holds the communication member.

7. The secondary battery module according to claim 6, wherein
    the holder comprises a first wiring passage that extends along a longitudinal direction of the holder.

8. The secondary battery module according to claim 7, wherein
    the holder comprises a flange that projects along an upper surface of the cell blocks, extends along the longitudinal direction of the holder with a predetermined width and covers and hides the upper surface of a bus bar that electrically connects the cell blocks with each other.

9. The secondary battery module according to claim 8, wherein
    the holder comprises a second wiring passage that extends along the longitudinal direction of the holder in an upper part of the flange.

10. The secondary battery module according to claim 1, further comprising at least one of:
    a harness that connects the cell blocks and an external terminal to each other,
    a voltage detection line that connects the voltage detection substrates and a control device to each other, and
    a sensor line that connects temperature detecting sensors that detect temperature of the battery cells and the control device to each other.

11. The secondary battery module according to claim 1, wherein the module case includes:
    a lower cap section;
    an upper cap section detachably attached on top of the lower cap section and openingly formed with an upper cap opening that communicates with the inside of the module case;
    a shutter movably supported by the upper cap section and capable of being disposed selectively at an opened position for opening the upper cap opening and a closed position for closing the upper cap opening; and a safety switch that electrically disconnects the battery cells by detaching a connector that is detachably attached at a position opposing an opening side in a moving direction of the closed position of the shutter.

12. The secondary battery module according to claim 11, wherein
the module case comprises a safety bolt that fastens the lower cap section and the upper cap section together, and is covered and hidden at the closed position and is exposed at the opened position by the shutter.

13. The secondary battery module according to claim 12, wherein
the shutter comprises a window hole that is disposed above the safety bolt and exposes the safety bolt at the closed position.

14. The secondary battery module according to claim 4, wherein the module case includes:
a case bottom wall section that spreads in a flat plane shape between the case front wall section and the case back wall section;
middle wall ribs that are erected on the case bottom wall section, extend in a front/back direction in the module case, and form a plurality of cell block storage chambers in the module case; and
recess groove sections that are recessed in the case bottom wall section, extend in the lateral direction in the module case, and communicate the plurality of cell block storage chambers with each other.

15. The secondary battery module according to claim 14, wherein the module case includes:
a case side wall section that is bent at an end on one side in the lateral direction of the case bottom wall section and extends upward;
a side wall rib that extends in the front/back direction along the case side wall section and forms a gas exhaust chamber with which ends of the recess groove sections communicate in a gap between the case side wall section; and
a gas exhaust pipe that is connected to a gas exhaust port that opens to the case side wall section, communicates with the gas exhaust chamber and discharges gas having flown in to the gas exhaust chamber to the outside of the module case.

16. A secondary battery module, the secondary module comprising:
a module case that stores cell blocks, wherein each of the cell blocks includes a plurality of battery cells;
a suction duct communication member inserted into suction ports that open to a case front wall section of the module case and communicate a suction duct that introduces a coolant and a coolant introduction port that opens to a case front end surface section of the cell blocks; and
an exhaust duct communication member inserted into an exhaust port that opens to a case back wall section of the module case and communicates a gas tight exhaust duct that leads out the coolant and coolant lead out ports that open to case back end surface section of the cell blocks,
wherein one or more cell block voltage detection substrates are exposed to a space region between an end of the case wall section and the cell blocks,
wherein a forward space region is formed between the case front wall section and the case front end surface section and outside the suction duct communication member, and a backward space region is formed between the case back wall section and the case back end surface section and outside the exhaust duct communication member, and
wherein wiring is executed for connecting respective battery cells and a control unit to each other, said wiring gathered together using the forward space region and the backward space region as wiring passages.

17. The secondary battery module according to claim 16, wherein the module case comprises a lower cap section capable of storing the cell blocks with an upper part thereof being opened, and an upper cap section that is detachably attached to the lower cap section and closes the upper part of the lower cap section, and
wherein a cell block hold-down section that holds down and fixes the cell blocks to the lower cap section is arranged in the upper cap section.

18. The secondary battery module according to claim 17, comprising:
a safety switch to which a connector is detachably attached and which electrically disconnects the battery cells by detachment of the connector,
wherein a fastening member that fastens the upper cap section and the lower cap section is arranged at a position exposed by detachment of the connector.

19. The secondary battery module according to claim 1, wherein the module case comprises a lower cap section capable of storing the cell blocks with an upper part thereof being opened, and an upper cap section that is detachably attached to the lower cap section and closes the upper part of the lower cap section, and
wherein a cell block hold-down section that holds down and fixes the cell blocks to the lower cap section is arranged in the upper cap section.

* * * * *